United States Patent
Sun et al.

(10) Patent No.: US 12,058,663 B2
(45) Date of Patent: Aug. 6, 2024

(54) METHODS PROVIDING RESOURCE SELECTION FOR DIRECTIONAL SIDELINK COMMUNICATIONS

(71) Applicant: Telefonaktiebolaget LM Ericsson (publ), Stockholm (SE)

(72) Inventors: Wanlu Sun, San Diego, CA (US); Shehzad Ali Ashraf, Aachen (DE); Marco Belleschi, Solna (SE); Ricardo Blasco Serrano, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 17/252,948

(22) PCT Filed: Sep. 9, 2019

(86) PCT No.: PCT/SE2019/050841
§ 371 (c)(1),
(2) Date: Dec. 16, 2020

(87) PCT Pub. No.: WO2020/060468
PCT Pub. Date: Mar. 26, 2020

(65) Prior Publication Data
US 2021/0160849 A1 May 27, 2021

Related U.S. Application Data

(60) Provisional application No. 62/733,238, filed on Sep. 19, 2018.

(51) Int. Cl.
*H04W 72/044* (2023.01)
*H04W 4/40* (2018.01)
*H04W 4/46* (2018.01)
*H04W 72/23* (2023.01)
*H04W 72/54* (2023.01)

(52) U.S. Cl.
CPC ......... *H04W 72/046* (2013.01); *H04W 72/23* (2023.01); *H04W 72/54* (2023.01); *H04W 4/40* (2018.02); *H04W 4/46* (2018.02)

(58) Field of Classification Search
None
See application file for complete search history.

(56) References Cited

U.S. PATENT DOCUMENTS 9,444,577 B1 * 9/2016 Zhang .............. H04L 25/03
10,194,411 B2 * 1/2019 Shilov ............. H04W 56/002
(Continued)

OTHER PUBLICATIONS

U.S. Appl. No. 62/715,512, filed Aug. 7, 2018, Freda et al., "NR V2X—Method for UE Autonomous Resource Selection", paragraph 132+.*
(Continued)

*Primary Examiner* — Gregory B Sefcheck
(74) *Attorney, Agent, or Firm* — Sage Patent Group

(57) ABSTRACT

According to some embodiments, a method may be provided to operate a wireless communication device. A transmission resource reservation is transmitted with associated directional information relating to a direction of transmission of a sidelink data message, and after transmitting the transmission resource reservation, the sidelink data message is transmitted in accordance with the directional information.

18 Claims, 23 Drawing Sheets

V2X Scenarios For An LTE/NR Based NW

(56) References Cited

U.S. PATENT DOCUMENTS

| | | | | |
|---|---|---|---|---|
| 10,470,204 | B2* | 11/2019 | Dinan | H04W 4/46 |
| 10,764,903 | B2* | 9/2020 | Lu | H04L 5/0058 |
| 10,869,318 | B2* | 12/2020 | Feng | H04W 4/44 |
| 10,952,093 | B2* | 3/2021 | Wallentin | H04W 40/12 |
| 10,980,036 | B2* | 4/2021 | Lu | H04W 36/26 |
| 11,005,607 | B2* | 5/2021 | Basu Mallick | H04L 1/1887 |
| 11,035,927 | B2* | 6/2021 | Stählin | G01S 19/48 |
| 11,218,901 | B2* | 1/2022 | Jung | H04L 5/0064 |
| 11,469,940 | B2* | 10/2022 | Nagaraja | H04W 24/10 |
| 2003/0152086 | A1 | 8/2003 | Batt | |
| 2016/0198486 | A1* | 7/2016 | Moshavi | H04W 72/12 455/450 |
| 2018/0097556 | A1* | 4/2018 | Nagaraja | H04W 36/0085 |
| 2018/0102826 | A1* | 4/2018 | Raghavan | H04B 7/0695 |
| 2018/0103445 | A1* | 4/2018 | Akkarakaran | H04J 11/0083 |
| 2018/0324571 | A1* | 11/2018 | Buckley | H04L 69/18 |
| 2018/0343646 | A1* | 11/2018 | Chou | H04W 16/14 |
| 2019/0020987 | A1* | 1/2019 | Khoryaev | H04W 76/14 |
| 2020/0029318 | A1* | 1/2020 | Guo | H04L 1/1819 |
| 2020/0037128 | A1* | 1/2020 | Lu | H04L 27/2627 |
| 2020/0045715 | A1* | 2/2020 | Li | H04W 72/121 |
| 2020/0229194 | A1* | 7/2020 | Belleschi | H04W 72/0453 |
| 2020/0281007 | A1* | 9/2020 | Sun | H04W 4/02 |
| 2020/0329468 | A1* | 10/2020 | Tang | H04W 72/02 |
| 2021/0051630 | A1* | 2/2021 | Chae | H04W 72/0453 |
| 2021/0127361 | A1* | 4/2021 | Yasukawa | H04W 4/70 |
| 2021/0168574 | A1* | 6/2021 | Zhang | H04W 56/001 |
| 2021/0234580 | A1* | 7/2021 | El-Keyi | H04L 25/0204 |
| 2021/0242921 | A1* | 8/2021 | Thurfjell | H04B 7/0617 |
| 2021/0250118 | A1* | 8/2021 | Roth-Mandutz | H04W 72/10 |
| 2021/0314917 | A1* | 10/2021 | Lee | H04W 72/02 |
| 2021/0329596 | A1* | 10/2021 | Freda | H04W 72/082 |
| 2021/0337512 | A1* | 10/2021 | Belleschi | H04W 4/40 |
| 2022/0104178 | A1* | 3/2022 | Lee | H04W 72/02 |
| 2023/0078193 | A1* | 3/2023 | Fong | H04W 72/25 370/329 |

OTHER PUBLICATIONS

PCT International Search Report and Written Opinion mailed Nov. 12, 2019 for International Application No. PCT/SE2019/050841, 10 pages.
3GPP, 3GPP RAN WG1 Meeting #94, R1-1808599, XP051515976, InterDigital Inc, "Resource Allocation for NR V2X"', Gothenburg, Sweden, Aug. 20-24, 2018, 4 pages.

* cited by examiner

V2X Scenarios For An LTE/NR Based NW

Omnidirectional PSCCH and Omnidirectional PSSCH: Inefficient Spatial Resource Utilization Directional PSCCH And Directional PSSCH: Interference Omnidirectional PSCCH And Directional PSSCH: Interference Omnidirectional PSCCH And Directional PSSCH Relative Direction Between Current Driving Direction and Future Target Transmission Direction Absolute Direction Between Reference Direction And Future Target Transmission Direction UE3 Transmits To UE4, Where UE4 Is Within The Target Transmission Area of UE1

UE3 Transmits To UE5, Where UE5 Is Out Of The Target Transmission Area of UE1

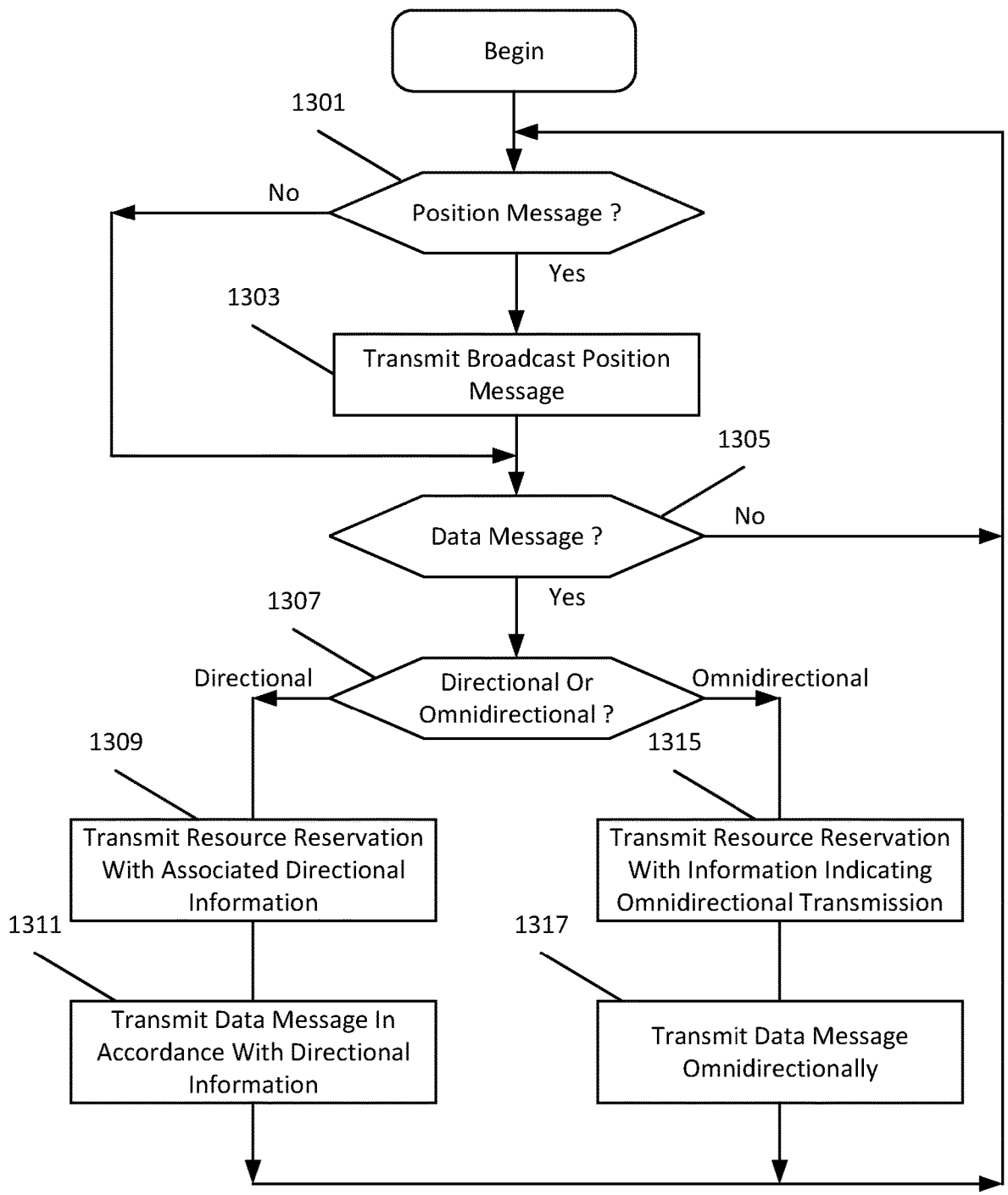

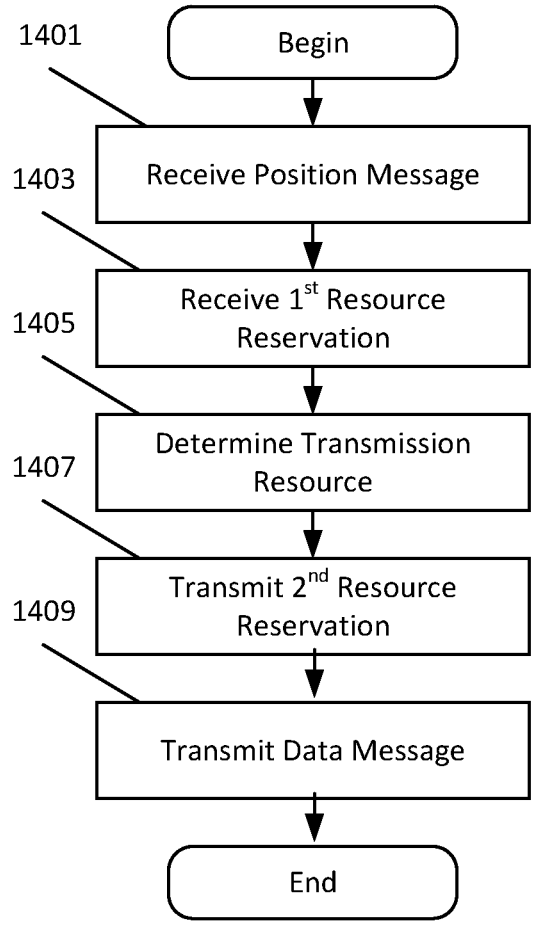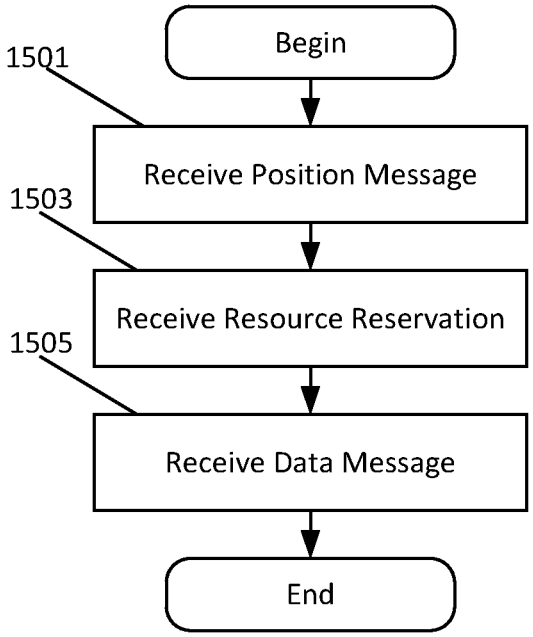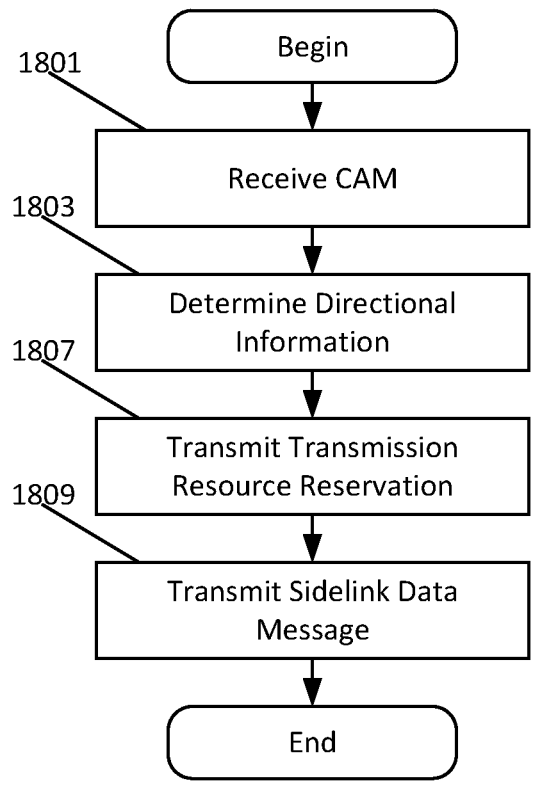

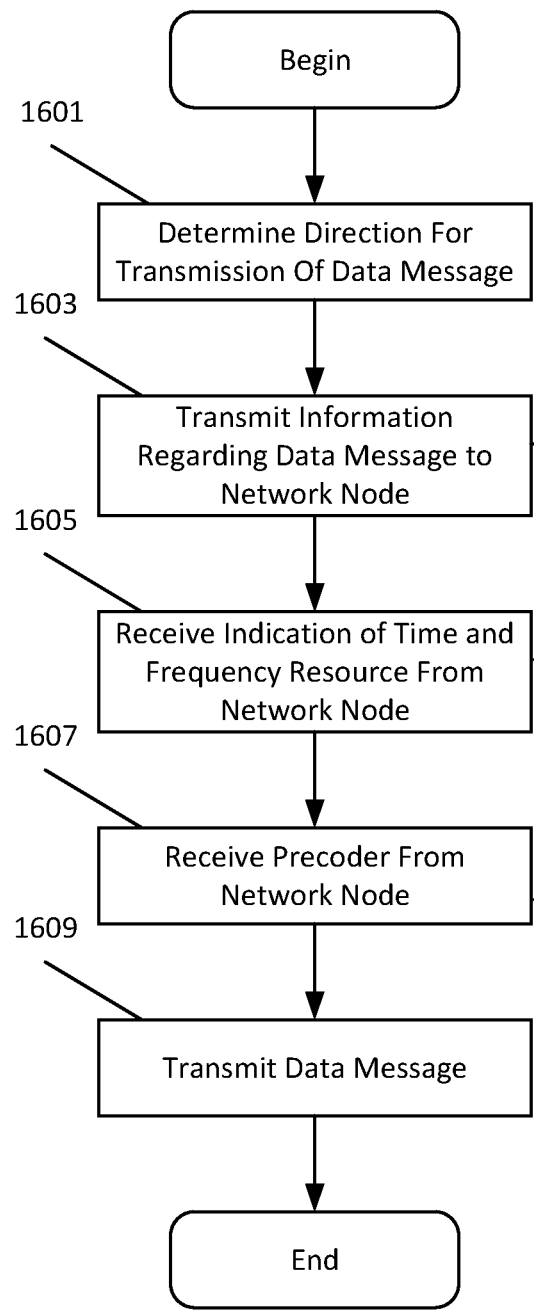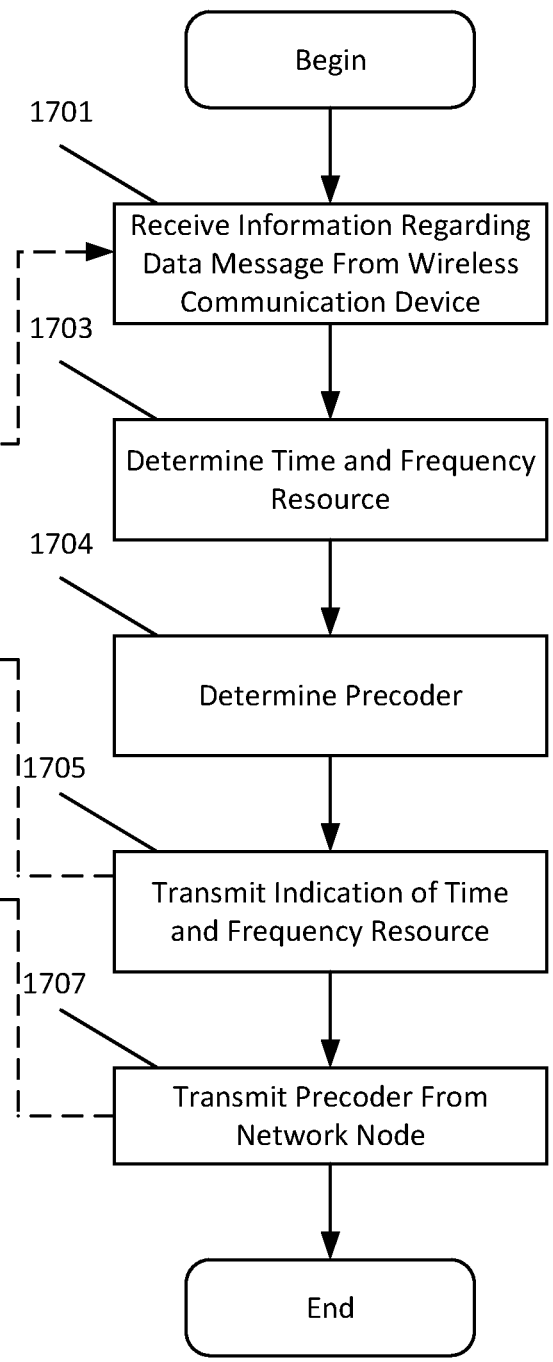
Figure 16
Figure 17

METHODS PROVIDING RESOURCE SELECTION FOR DIRECTIONAL SIDELINK COMMUNICATIONS

TECHNICAL FIELD

The present disclosure relates generally to communications, and more particularly, to wireless communications and related wireless communication devices and network nodes.

BACKGROUND

The present disclosure relates to wireless communications, and more particularly, to wireless communication methods and related wireless terminals and network nodes.

LTE V2X (Vehicle to anything) communication was first specified in Release 14, and recently, some advancements have been specified in Release 15. LTE V2X includes new features and enhancements that allow for vehicular communications. One of the most relevant aspects is the introduction of direct vehicle-to-vehicle (V2V) communication functionalities. The specifications support other types of vehicle-to-anything (V2X) communications, including V2P (vehicle-to-pedestrian or pedestrian-to-vehicle), V2I (vehicle-to-infrastructure), etc., as shown in FIG. 1. FIG. 1 illustrates V2X scenarios for an LTE-based Radio Access Network NW. As shown in FIG. 1, V2I (vehicle-to-infrastructure) communications may be provided between a vehicle and the radio access network RAN (e.g., between UE-1 and eNB or between UE-2 and eNB), V2V (vehicle-to-vehicle) communications may be provided directly between different vehicles (without communicating through the radio access network), and V2P (vehicle-to-pedestrian) communications may be provided directly between a vehicle and a device held/carried by the pedestrian (e.g., a smartphone, a tablet computer, etc.). V2X communications are meant to include any/all of V2I, V2P, and V2V communications.

These direct communication functionalities are built upon LTE D2D (device to device), also known as ProSe (Proximity Services), as first specified in the Release 12 of LTE, and include many important enhancements targeting the specific characteristics of vehicular communications. For example, LTE V2X operation may be possible with and without network coverage and with varying degrees of interaction between the UEs (user equipment) and the NW (network), including support for standalone, network-less operation. To enhance the system level performance under high density while meeting the latency requirements of V2X, new transmission modes (also referred to as resource allocation modes) were introduced: Mode 3 and Mode 4. In Mode 3, the NW is in charge of performing resource allocation, whereas in Mode 4, the UE autonomously selects the resources for its own transmissions. This disclosure deals with some aspects related to Mode 4.

In NR (New Radio), sidelink V2X functionalities in 3GPP may be extended to address a new set of advanced use cases such as data/sensor sharing, cooperative maneuvers, platooning, autonomous driving, etc., which may demand stringent QoS (Quality of Service) requirements. With many UE devices performing sidelink communications, however, a potential for interference may increase.

SUMMARY

According to some embodiments of inventive concepts, a method is provided to operate a wireless communication device. A transmission resource reservation is transmitted with associated directional information relating to a direction of transmission of a sidelink data message. After transmitting the transmission resource reservation, the sidelink data message is transmitted in accordance with the directional information.

According to some other embodiments of inventive concepts, a method is provided to operate a second wireless communication device. A transmission resource reservation is received from a first wireless communication device, wherein the transmission resource reservation is received with associated directional information relating to a direction of transmission of a first sidelink data message from the first wireless communication device. A transmission resource for a second sidelink data message to be transmitted from the second wireless communication device is determined based on the transmission resource reservation and the directional information relating to the direction of transmission of the first sidelink data message. The second sidelink data message is transmitted using the transmission resource determined for the second sidelink data message.

According to some embodiments of inventive concepts, interference from/between sidelink communications may be reduced and/or managed.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 13-16 are a flow charts illustrating operations of wireless communication devices according to some embodiments of inventive concepts;

FIG. 17 is a flow chart illustrating operations of a network node (base station) according to some embodiments of inventive concepts;

FIG. 18 is a flow chart illustrating operations of wireless communication device according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 11:
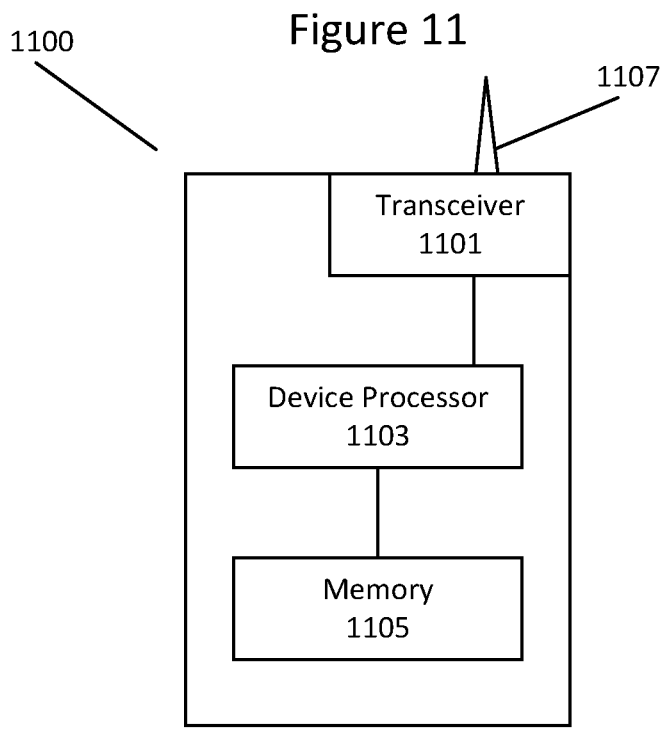
FIG. 11 is a block diagram illustrating a wireless communication device UE according to some embodiments of inventive concepts.

FIG. 11 is a block diagram illustrating elements of a wireless communication device UE 1100 (also referred to as a wireless device, a wireless terminal, a wireless communication terminal, user equipment, UE, or a user equipment node/terminal/device) configured to provide V2X sidelink communication according to embodiments of inventive concepts. As shown, wireless communication device UE 1100 may include a transceiver circuit 1101 (also referred to as a transceiver) including a transmitter and a receiver configured to provide uplink and downlink radio communications with a base station of a radio access network, and to provide V2X sidelink communications (e.g., V2V and/or V2P communications) directly with other V2X wireless communication devices. Wireless communication device UE 1100 may also include a processor circuit 1103 (also referred to as a processor) coupled to the transceiver circuit, and a memory circuit 1105 (also referred to as memory) coupled to the processor circuit. The memory circuit 1105 may include computer readable program code that when executed by the processor circuit 1103 causes the processor circuit to perform operations according to embodiments disclosed herein. According to other embodiments, processor circuit 1103 may be defined to include memory so that a separate memory circuit is not required. Wireless communication device UE may also include an interface (such as a user interface) coupled with processor 1103, and/or wireless communication device UE may be incorporated in a vehicle.

As discussed herein, operations of wireless communication device UE 1100 may be performed by processor 1103 and/or transceiver 1101. For example, processor 1103 may control transceiver 1101 to transmit communications through transceiver 1101 over a radio interface to another UE and/or to receive communications through transceiver 1101 from another UE over a radio interface. In addition, processor 1103 may control transceiver 1101 to receive communications through transceiver 1101 from Radio Access Network base station (e.g., an eNodeB/eNB or gNodeB/gNB). Moreover, modules may be stored in memory 1105, and these modules may provide instructions so that when instructions of a module are executed by processor 1103, processor 1103 performs respective operations (e.g., operations discussed below with respect to Example Embodiments 1-63 and/or one or more of FIGS. 13-16).

Figure 12:
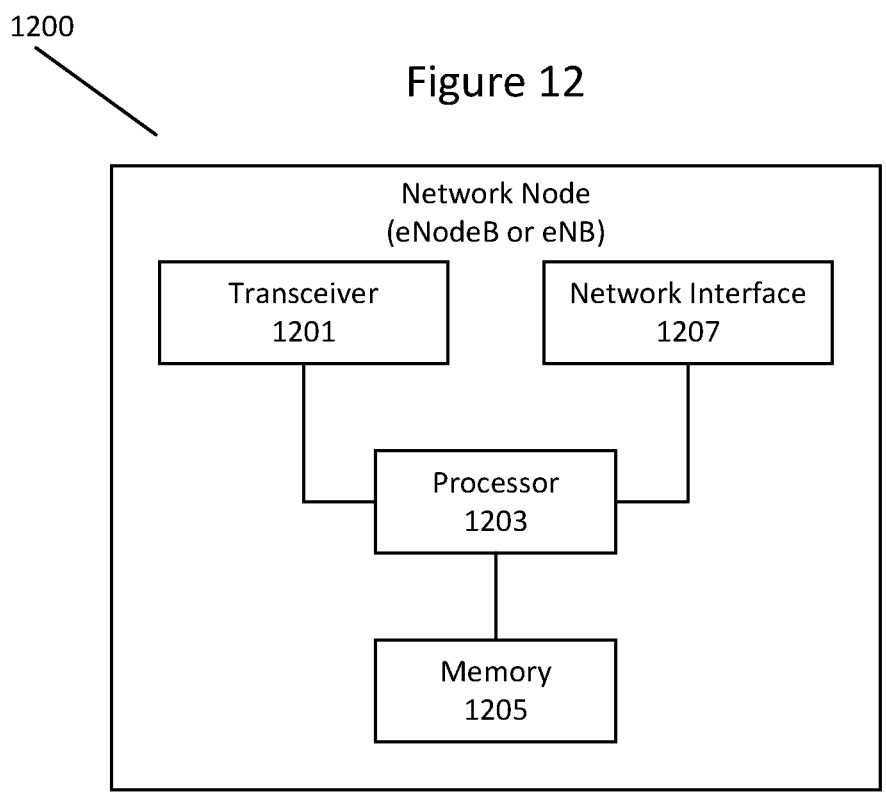
FIG. 12 is a block diagram illustrating a network node according to some embodiments of inventive concepts.

FIG. 12 is a block diagram illustrating elements of a node (also referred to as a network node, base station, eNB, eNodeB, gNB, gNodeB, etc.) of a Radio Access Network (RAN) configured to provide cellular communication according to embodiments of inventive concepts. As shown, the network node may include a transceiver circuit 1201 (also referred to as a transceiver) including a transmitter and a receiver configured to provide uplink and downlink radio communications with wireless communication devices UEs. The network node may include a network interface circuit 1207 (also referred to as a network interface) configured to provide communications with other nodes (e.g., with other base stations and/or core network nodes) of the RAN and/or core network. The network node may also include a processor circuit 1203 (also referred to as a processor) coupled to the transceiver circuit, and a memory circuit 1205 (also referred to as memory) coupled to the processor circuit. The memory circuit 1205 may include computer readable program code that when executed by the processor circuit 1203 causes the processor circuit to perform operations according to embodiments disclosed herein. According to other embodiments, processor circuit 1203 may be defined to include memory so that a separate memory circuit is not required.

As discussed herein, operations of the network node may be performed by processor 1203, network interface 1207, and/or transceiver 1201. For example, processor 1203 may control transceiver 1201 to transmit communications through transceiver 1201 over a radio interface to one or more UEs and/or to receive communications through transceiver 1201 from one or more UEs over a radio interface. Similarly, processor 1203 may control network interface 1207 to transmit communications through network interface

1207 to one or more other network nodes and/or to receive communications through network interface from one or more other network nodes. Moreover, modules may be stored in memory 1205, and these modules may provide instructions so that when instructions of a module are executed by processor 1203, processor 1203 performs respective operations (e.g., operations discussed below with respect to Example Embodiments 66-72 and/or FIG. 17).

ETSI (European Telecommunications Standards Institute) has defined two types of V2X messages for road safety: Co-operative Awareness Message (CAM) and Decentralized Environmental Notification Message (DENM).

CAM: The CAM message is intended to enable vehicles, including emergency vehicles, to notify their presence and other relevant parameters including at least position and velocity in a broadcast fashion. Such messages target other vehicles, pedestrians, and infrastructure, and are handled by their applications. A CAM message may also serve as active assistance to safety driving for normal traffic.

DENM: The DENM message is event-triggered, such as by braking and emergency detection.

LTE V2X design targets the transmissions of CAM and DENM. On the other hand, in 3GPP New Radio (NR) V2X, more advanced use cases, such as platooning, cooperative maneuver, and sensor sharing, may need to be supported. Hence, new V2X messages will be introduced. To improve/optimize/design the transmissions of new V2X messages, the content included in CAM and DENM (e.g., position and velocity) can be considered as prior information, which can be further exploited.

LTE V2X design may only aim at broadcast services over the PC5. However, in current NR studies, it is agreed that unicast and groupcast may also be studied since they may also be needed for some eV2X use cases (e.g., platooning, see-through, and cooperative maneuver). For unicast and groupcast, directional transmission may be quite beneficial to both improve the transmission to the target receiver(s) and/or reduce interference to other UEs.

Directional transmission may be provided by focusing the energy broadcast during a transmission into a specific area of the space. Directional transmission may improve transmission by ensuring that the power to the intended receiver(s) is larger than in the case the signal is broadcasted in an omnidirectional way. In addition, directional transmission may reduce/minimize interference created to other parts of the space on which there are no intended receiver(s).

Directional transmission may be implemented using multiple antennas (i.e., antenna selection or beamforming), using directional antennas (i.e., antennas with a directional pattern), or a combination of both.

It is already agreed in the New Radio NR V2X Study Item Description SID that sidelink frequencies for frequency 1 FR1 (up to 6 GHz) and frequency 2 FR2 (up to 52.6 GHz) unlicensed ITS bands and licensed bands are considered in the study. Due to the propagation characteristics of mmW (millimeter wave) bands (e.g., FR2), directional transmission may be particularly useful at high frequency bands to increase communication range and/or improve transmission reliability.

Distributed resource selection is provided in LTE Release 14/15 mode 4 transmissions. In LTE Release 14/15, the distributed resource allocation mechanism of mode 4 transmissions is based on two functionalities: semi-persistent transmission and sensing-based resource allocation.

Semi-persistent transmission is a type of transmission in which the UE sending a message also notifies the receivers about its intention to transmit using certain time-frequency resources at a later point in time. For example, a UE transmitting at time T informs the receivers that it will transmit using the same frequency resources at time T+100 ms. This is called resource reservation or resource booking and may be especially suitable for the type of vehicular applications targeted by LTE Release 14/15 which may rely on the periodic transmission of packets.

Semi-persistent transmission allows a UE to predict the utilization of the radio resources in the future. That is, by listening to the current transmissions of another UE, it also obtains information about potential future transmissions. This information can be used by the UE to reduce/avoid collisions when selecting its own resources. Specifically, a UE may predict the future utilization of the radio resources by reading received booking messages and then may schedule its current transmission to avoid using the same resources. This is known as sensing-based resource selection.

The sensing-based resource selection scheme specified in Rel-14 includes the following three steps.

Step a: all the resources are considered available.

Step b: UE excludes resources at least based on sidelink control information (SCI) decoding and additional conditions, where SCI is transmitted on PHY (Physical) Sidelink Control Channel (PSCCH) and carries a scheduling assignment (SA). A resource is excluded if it is indicated or reserved by a decoded SCI and PHY Sidelink Shared Channel (PSSCH) reference signal received power (RSRP) in the associated data resources is above a threshold. Note that both PSCCH and PSSCH are sent in broadcast mode.

Step c: UE measures and ranks the remaining PSSCH resources based on received signal strength indicator (RSSI) measurement and selects a subset. The subset is the set of candidate resources with the lowest total received energy. The size of the subset is, e.g., 20%, of the total resources within the selection window.

In conventional autonomous resource selection (e.g., resource allocation scheme for mode-4 UEs in LTE Rel-14/15 V2X), a UE's selected resource is based on its own sensing outcome. This mechanism may work well for SL (Sidelink) broadcast (i.e., omnidirectional transmission) specified in LTE.

In NR, it is expected that unicast/groupcast/geocast will also be employed by SL. For unicast or groupcast, directional transmission may be a more efficient way in terms of beamforming gain and less interference to other irrelevant UEs. More specifically, for SL unicast/groupcast/geocast, control (e.g., SCI) and data can be directionally transmitted to the target UE(s). With directional transmission, however, the Rel-14/15 autonomous resource selection scheme and its simple extensions may not work well, where the reasons are explained below considering different transmission scenarios.

Figure 1:
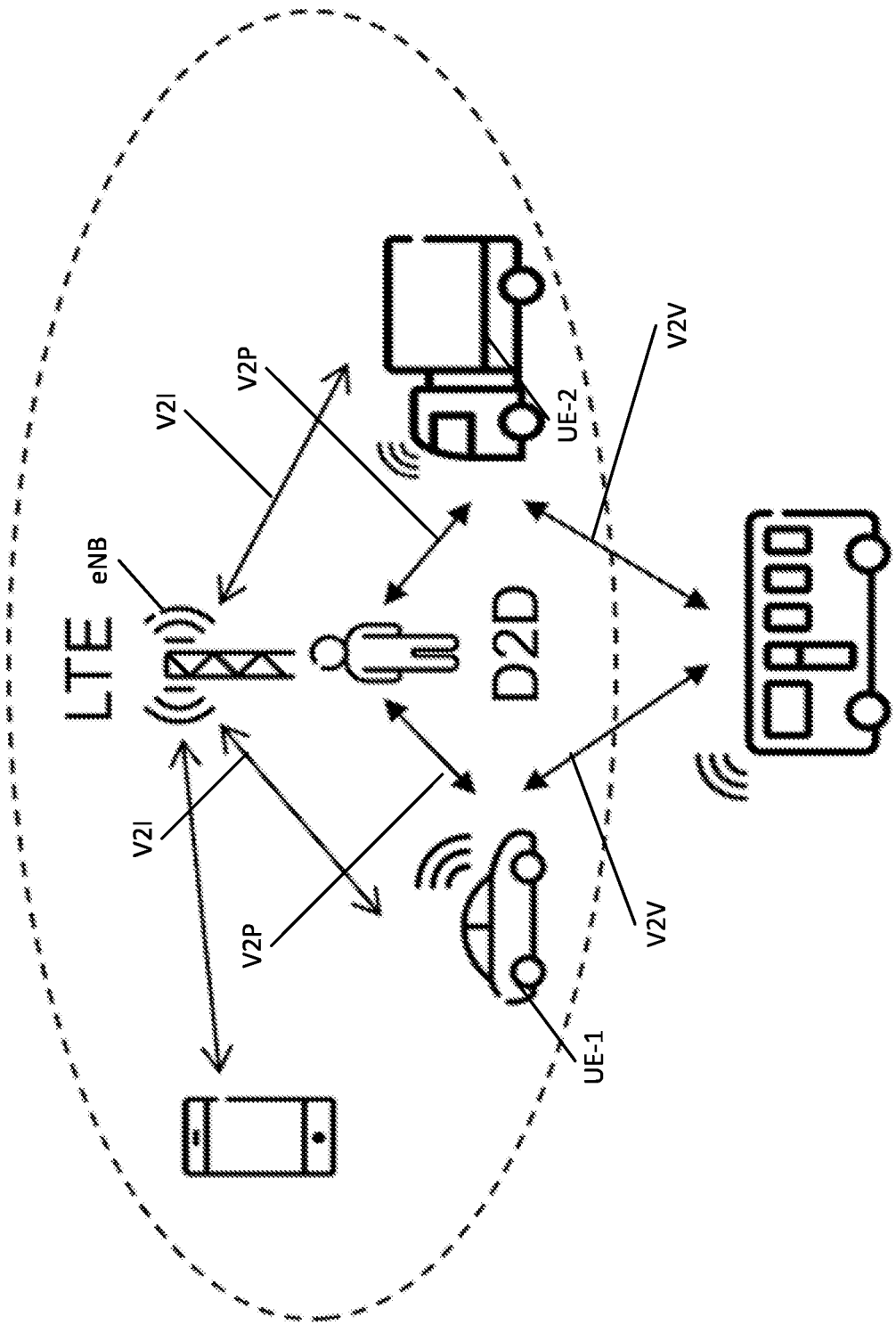
FIG. 1 is a schematic diagram illustrating V2X (Vehicle-to-Anything) communication scenarios in an LTE base network.
Figure 2:
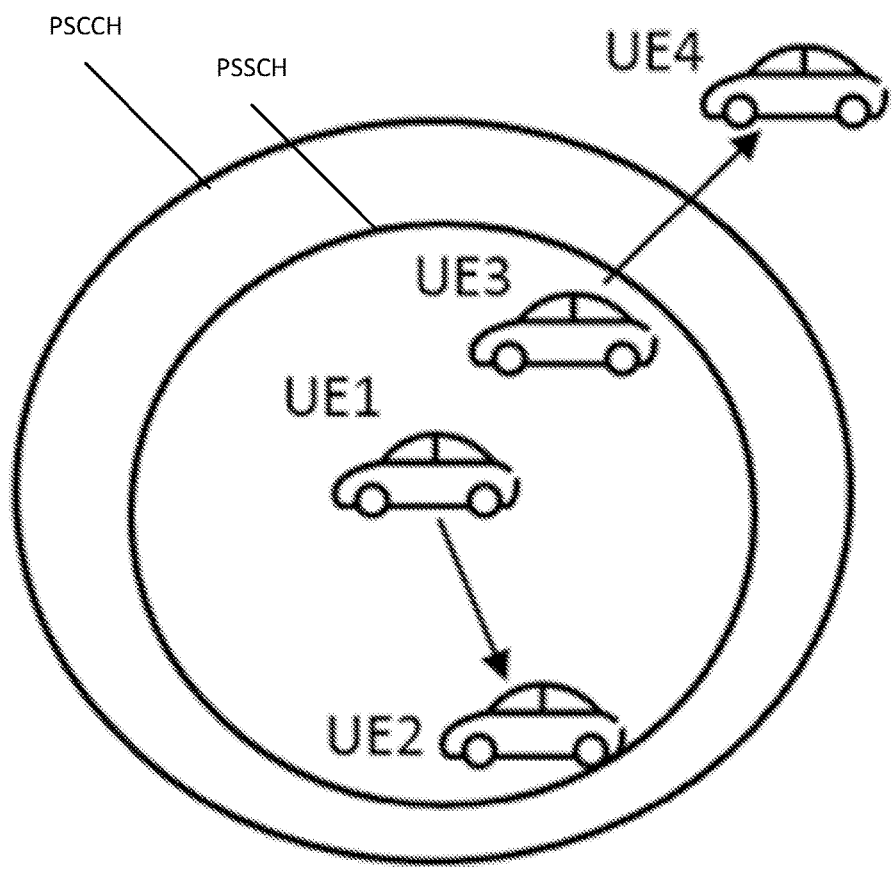
FIG. 2 is a schematic diagram illustrating V2V communication using omnidirectional control and shared channels.

Scheme 1 refers to omnidirectional PSCCH (Physical Sidelink Control Channel) and omnidirectional PSSCH (Physical Sidelink Shared Channel). In this scheme, both PSCCH and PSSCH are transmitted in an omnidirectional manner as in legacy Rel-14/15, which is illustrated in FIG. 2. In FIG. 2, omnidirectional PSCCH and omnidirectional PSSCH may result in inefficient spatial resource utilization In FIG. 2, although UE1's target receiver is only UE2 while UE3's target receiver is only UE4, they use omnidirectional transmissions. According to R14/15 resource selection scheme, UE1 and UE3 will not select the same resource since they are in each other's communication range. However, this may be inefficient in terms of spatial reuse. Note that UE1 and UE3 are only interested in their respective unicast sessions, which may be achieved more efficiently by two directional transmissions being separated in the spatial domain.

Figure 3:
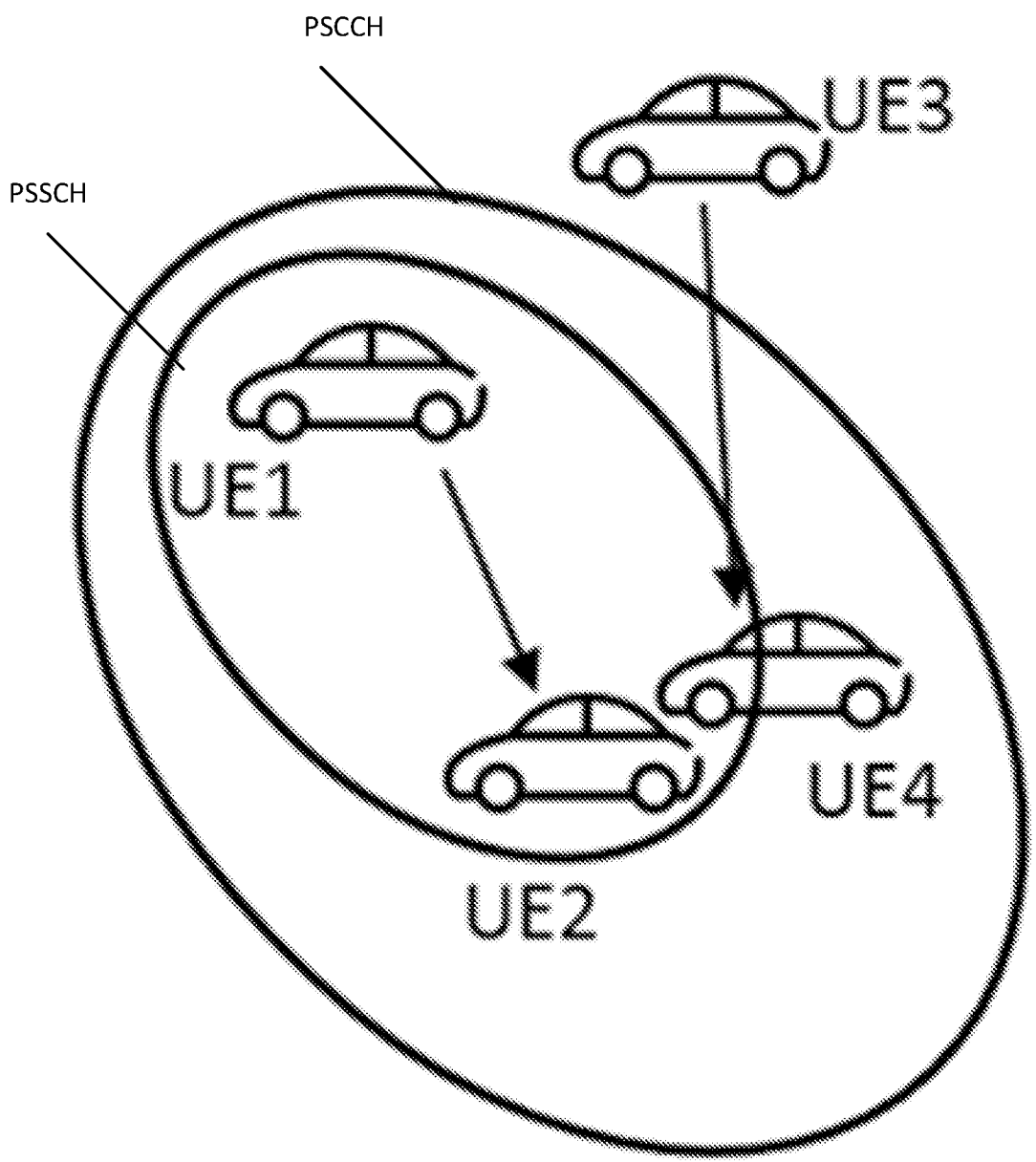
FIG. 3 is a schematic diagram illustrating V2V communication using directional control and shared channels.

Scheme 2 refers to directional PSCCH and directional PSSCH. Due to the problem analyzed above, a potential extension may be to apply directional PSCCH and PSSCH. As illustrated in FIG. 3, if UE1 is interested in a unicast session with UE2, it can use directional transmission for better resource utilization. However, since UE1's PSCCH is also in directional mode, UE3 cannot receive it and may select the same resource with UE1 for its own transmission to UE4. In this case, the two transmissions, i.e., UE1 to UE2 and UE3 to UE4 may interfere with each other. FIG. 3 illustrates interference resulting from directional PSCCH and directional PSSCH.

Figure 4:
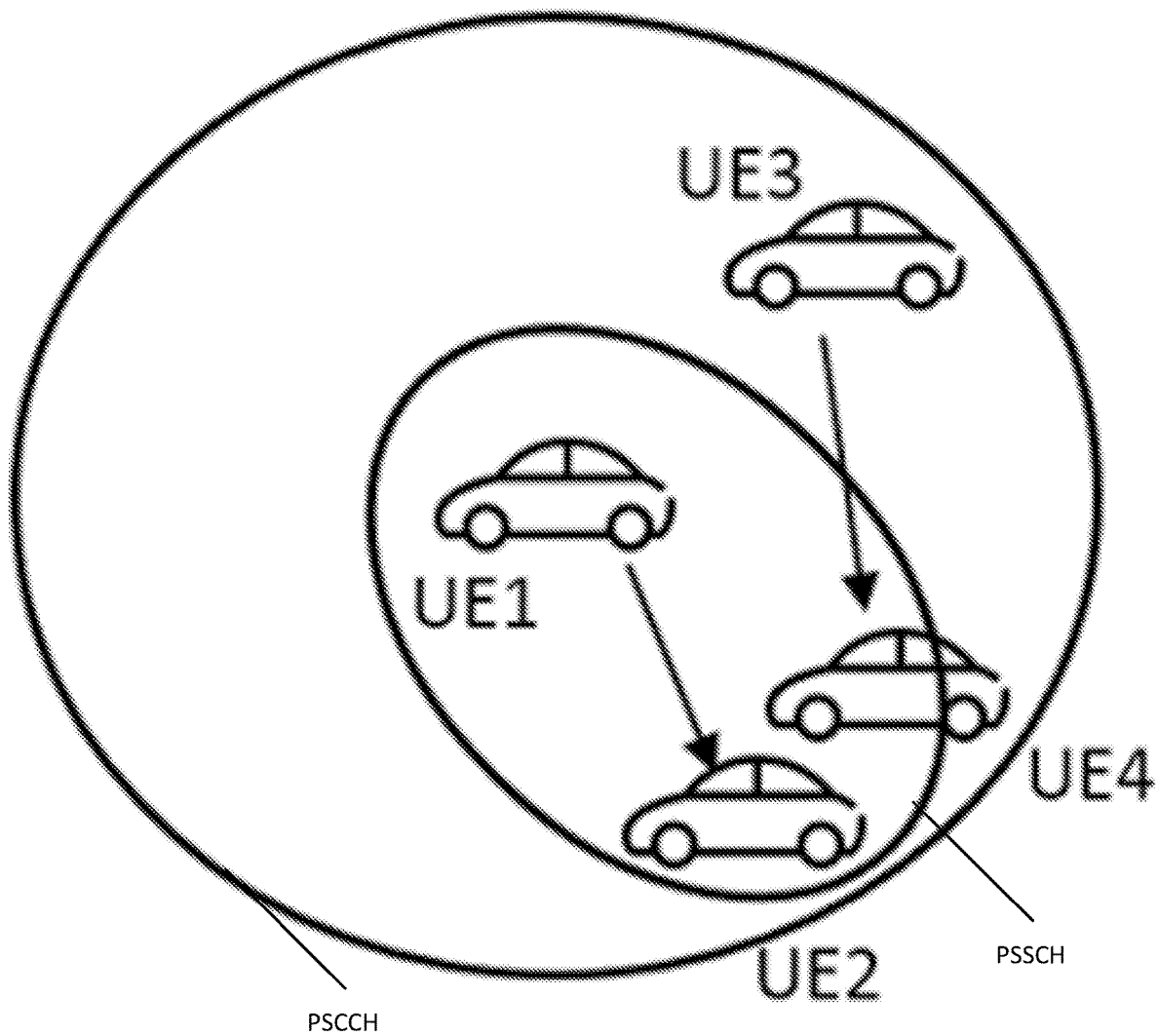
FIG. 4 is a schematic diagram illustrating V2V communication using an omnidirectional control channel and a directional shared channel.

Scheme 3 refers to omnidirectional PSCCH and directional PSSCH. Another potential extension is to combine omnidirectional PSCCH and directional PSSCH, as illustrated in FIG. 4. However, according to the sensing procedure of R14/R15, a resource is excluded if it is indicated by a decoded SCI and PSSCH RSRP in the associated data resources is above a threshold. Hence, the resource selected by UE1 will not be excluded by UE3 as the associated RSRP measurement will be lower than the threshold. In this way, it may still happen that UE1 and UE3 select the same resource for their respective transmissions and interfere each other. FIG. 4 illustrates interference resulting from Omnidirectional PSCCH and directional PSSCH.

According to some embodiments of inventive concepts, a method of distributed resource selection for sidelink directional transmissions may be provided. More specifically, both time-frequency and direction resources may be reserved for future transmission and utilized within a UE's resource selection process. Some embodiments of inventive concepts may include:
1. adding a new field in SCI which includes direction information of future transmissions; and/or
2. using the direction information jointly with the reserved time-frequency resource within a UE's sensing procedure.

According to some embodiments of inventive concepts:
1. network resource utilization may be improved by exploiting spatial reuse without increasing co-channel interference;
2. efficient coexistence of directional and omnidirectional transmissions may be enabled; and/or
3. hidden node problems may be reduced.

Some embodiments of inventive concepts are described herein in the context of V2X communications. However, embodiments mat also be applicable to direct communications between UEs, in other scenarios involving device-to-device communications.

Figure 5:
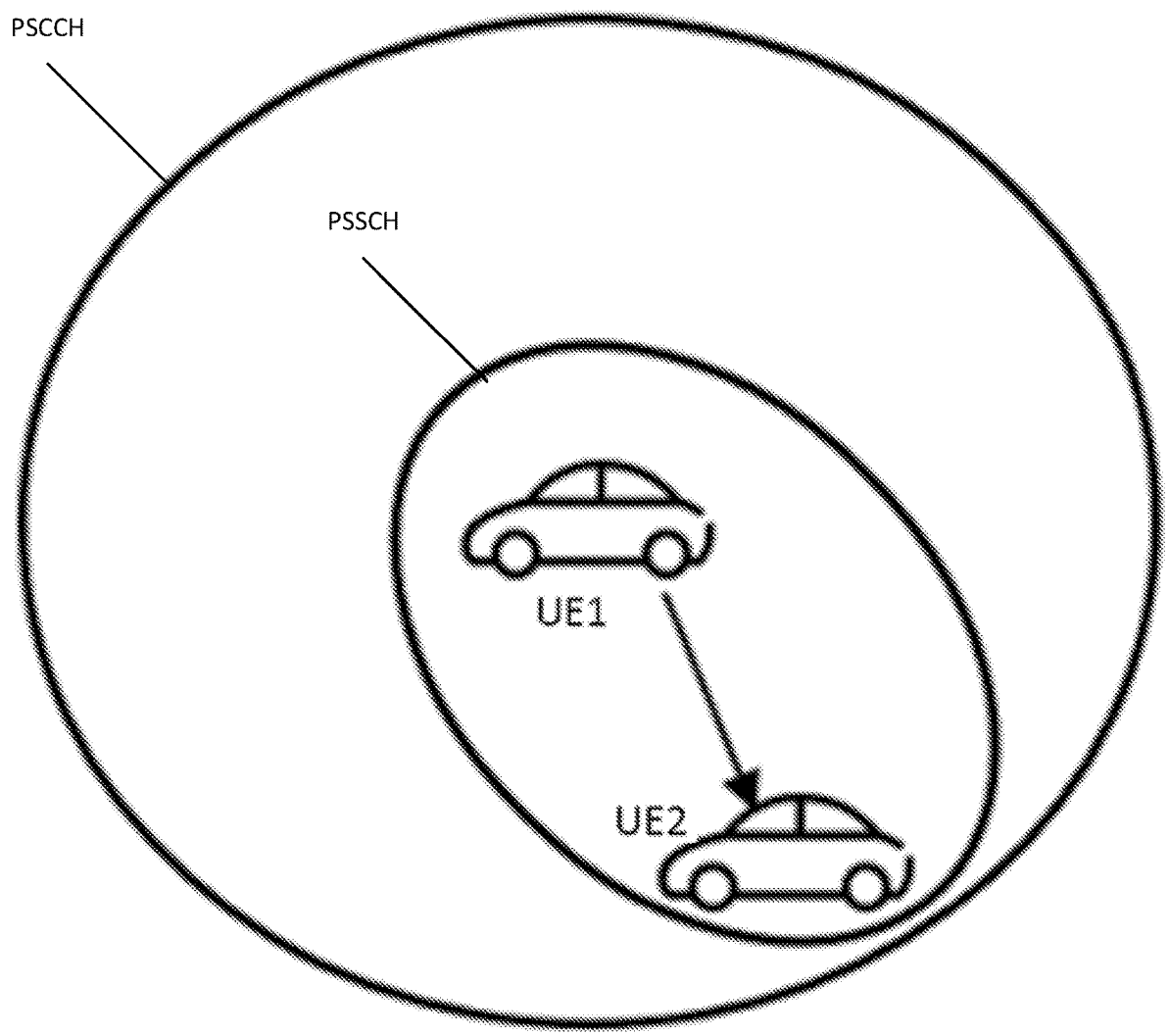
FIG. 5 is a schematic diagram illustrating V2V communication using an omnidirectional control channel and a directional shared channel.

Some embodiments of inventive concepts may be based on a combination of omnidirectional PSCCH and directional PSSCH, as illustrated in FIG. 5 where a first UE UE1 transmits to a second UE UE2. Additionally, embodiments of inventive concepts may consider sensing-based resource selection procedures, i.e., UE excludes resources based on a decoded Scheduling Assignment SA (which is carried on PSCCH) and additional measurement of a reference signal used for sensing (e.g., the PSSCH RSRP used in Rel14/15). FIG. 5 illustrates Omnidirectional PSCCH and directional PSSCH transmitted from first UE UE1.

Some embodiments of inventive concepts may include:
1. transmission of a new field in SCI or any equivalent control channel (such as CSI report, MAC CE, RRC) which includes direction information of future PSSCH sidelink data transmissions; and/or
2. in response to the reception of SCI including direction information, using this information as part of the UE's sensing procedure.

Some embodiments including a new field in SCI including direction information are discussed below.

For SL broadcast with omnidirectional transmission, only time and frequency resources may be used, and they may be reserved for future transmissions as in Rel14/15, where the reservation is indicated using sidelink control information (SCI). For SL with directional transmissions, to improve resource utilization by potential spatial reuse, some embodiments of inventive concepts propose also reserving a transmission direction for future transmissions. That is, a UE may reserve time-frequency resources for a future transmission in a limited direction. The reservation information, including the direction may be indicated using SCI. The direction information can be expressed in different forms.

Figure 6:
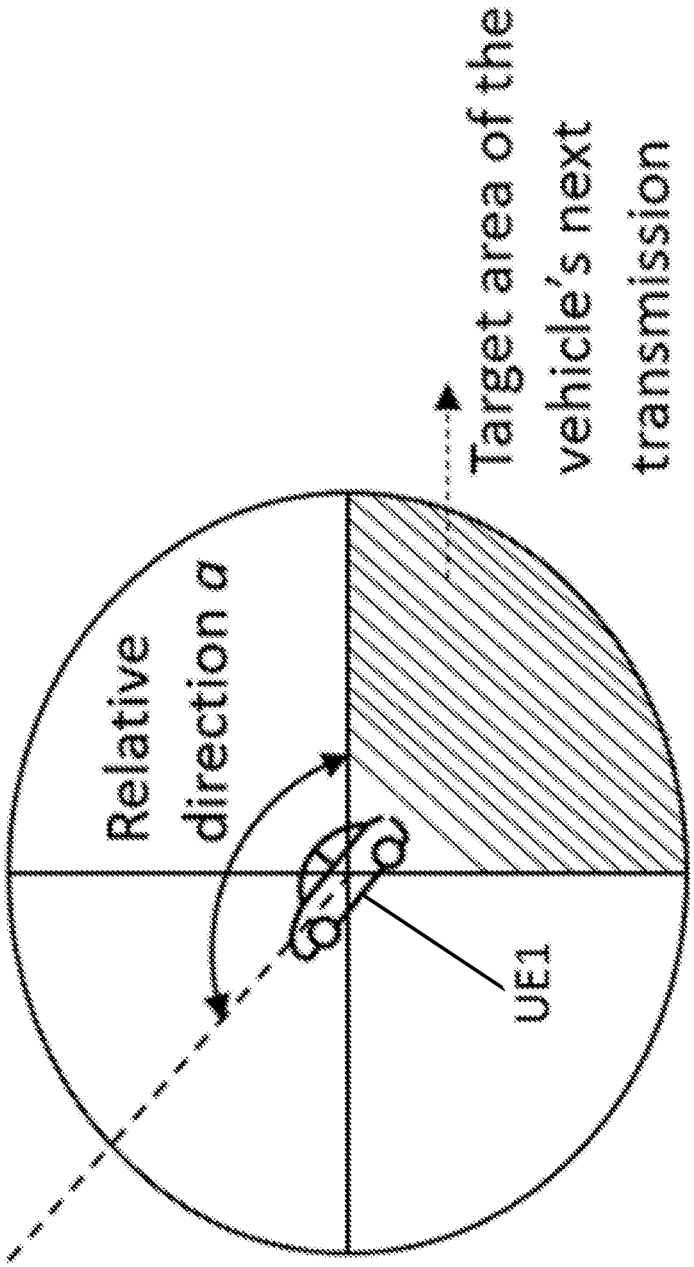
FIG. 6 is a schematic diagram illustrating indication of a target transmission direction relative to a direction of travel of a vehicle according to some embodiments of inventive concepts.
Figure 7:
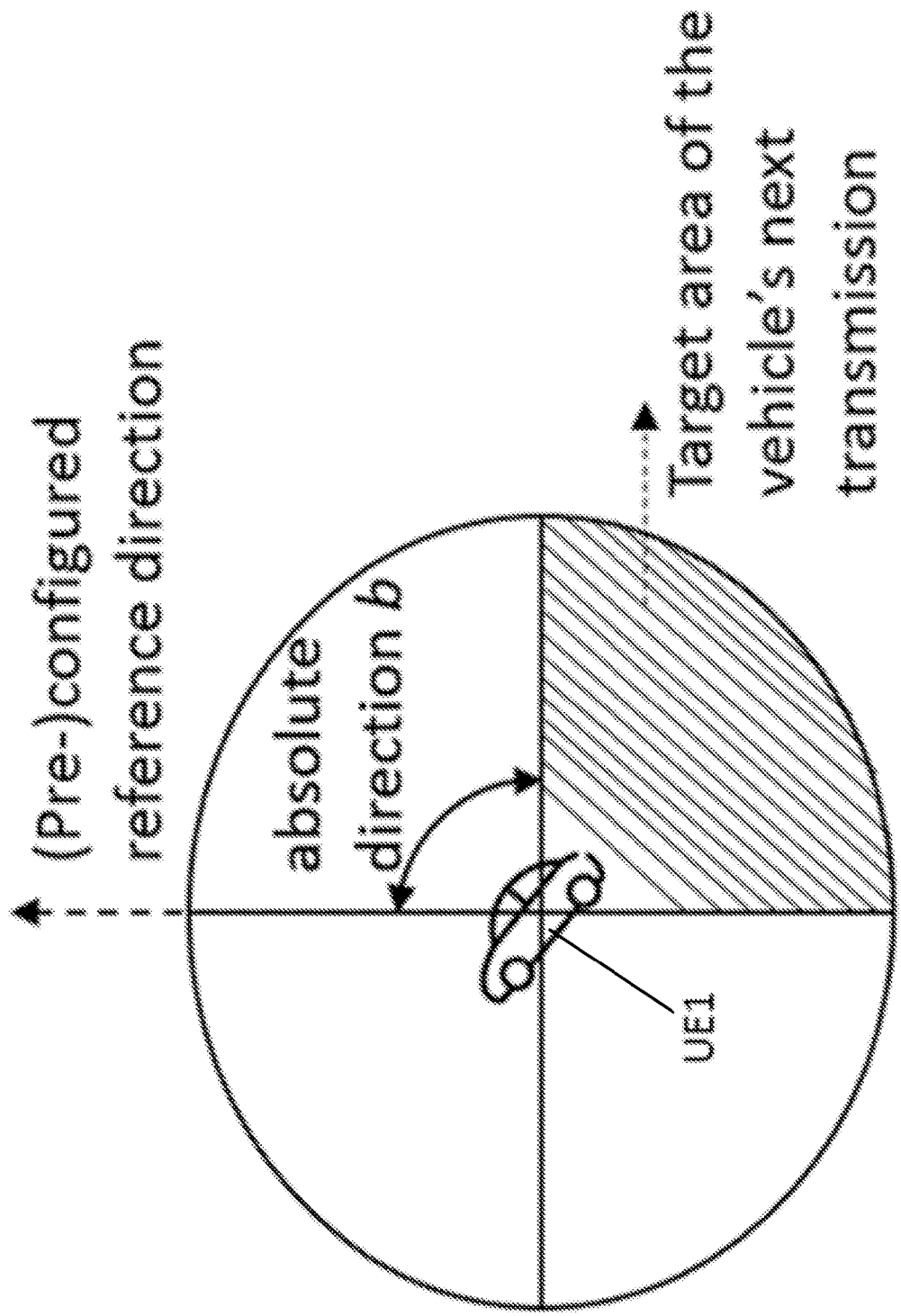
FIG. 7 is a schematic diagram illustrating indication of a target transmission direction relative to an absolute direction according to some embodiments of inventive concepts.

In some embodiments, the indicated direction may be provided relative to the vehicle's current driving direction and it is the reserved direction for future transmission. An example of such embodiments is illustrated in FIG. 6, where a denotes the relative direction between the vehicle's current driving direction and the vehicle's target transmission direction of its next transmission. FIG. 6 illustrates a relative direction between a current driving direction and a future target transmission direction In other embodiments, the indicated direction may be an absolute direction with respect to a reference global coordinate being (pre-)configured. An example is illustrated in FIG. 7. FIG. 7 illustrates an absolute direction between reference direction and future target transmission direction In still other embodiments, the indicated direction can represent a digital beam rather than a geographical direction. For example, the included direction information can be an index of a precoder in a (pre-)configured codebook.

Figure 8:
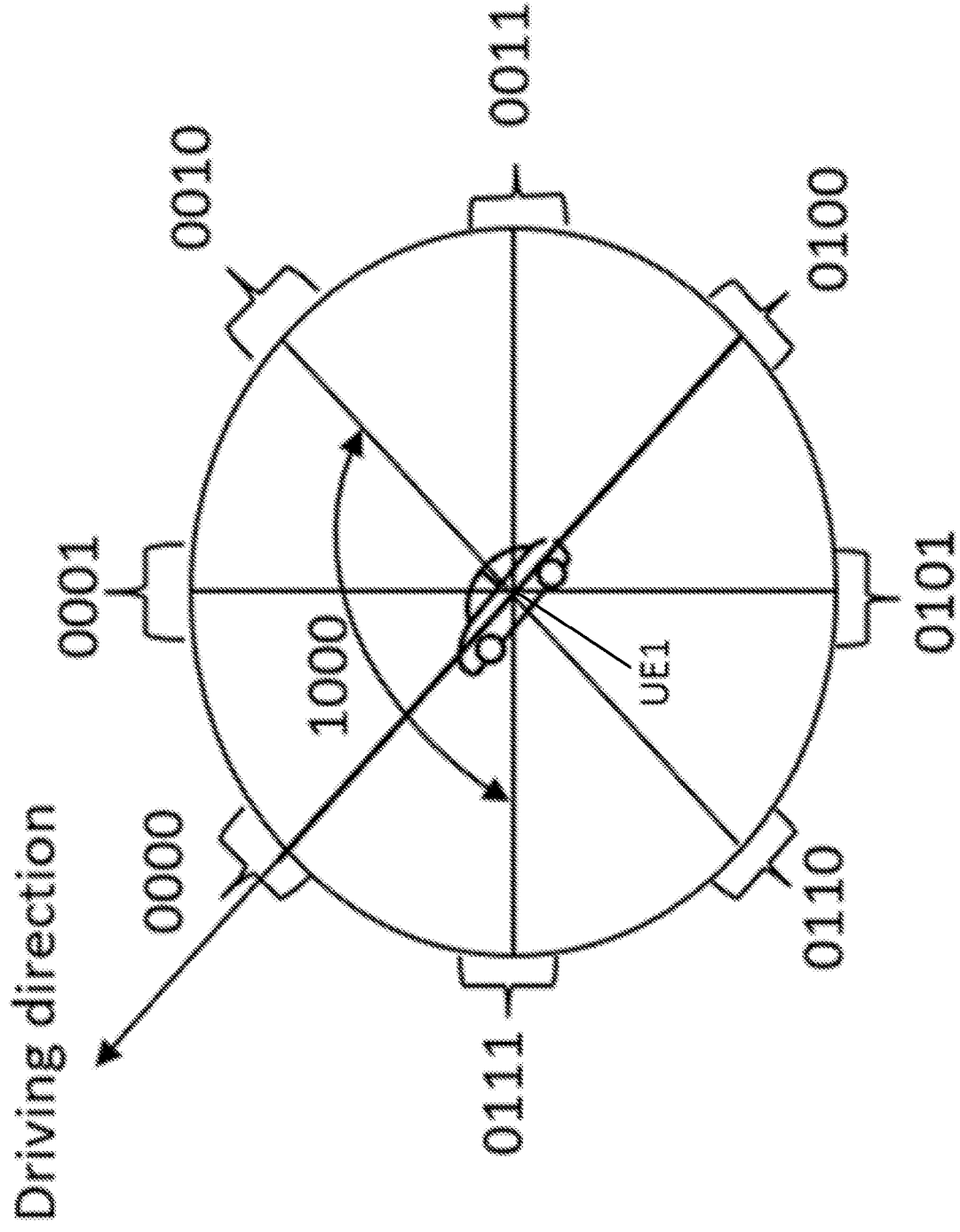
FIG. 8 is a schematic diagram illustrating indication of a target transmission direction using indices according to some embodiments of inventive concepts.

In one embodiment, to represent the target direction of a vehicle's next transmission, the area around the vehicle may be divided in to several sub-regions and the sub-regions are respectively coded by different bits. Note that the different bits can indicate not only which sub-region(s) the vehicle will transmit to but also the number of consecutive sub-regions. In the example illustrated in FIG. 8, the area is evenly divided into eight sub-regions. Bits 0XXX are used to indicate the target transmission direction with two adjacent sub-regions and bits 1XXX are used to indicate the target transmission direction with three adjacent sub-regions. With this way of coding, the target direction illustrated in FIG. 6 (i.e., the shadowing area) is represented by 0100. FIG. 8 illustrates a representation of a vehicle's target transmission direction.

In one embodiment, the direction information included in SCI indicates an omnidirectional transmission for its next packet. This may be useful when: 1) the next transmission will indeed be omnidirectional; and/or 2) the vehicle is unsure about its next transmission direction, for example, due to rapidly changing driving direction. To represent the omnidirectional information, in some examples, 5 bits may be used to indicate the transmission direction in the future, where '11111' represents the omnidirectional transmission.

In one embodiment, the direction information may indicate the desired transmission direction of the UE's future packet. In another embodiment, the direction information may indicate the nulling transmission direction of the UE's future packets, i.e., the area where the UE will not transmit to for its future packet.

In one embodiment, the direction information may be obtained by the relative geographical location between the UE and its intended receiver(s). This may be applicable to geocast scenarios, where the target receivers are located in a limited geographical area. In another embodiment, the direction information may be obtained based on the direction of the applied digital beam that the UE selected. This may be applicable to unicast and/or groupcast scenarios.

In one embodiment, the SCI is transmitted using omnidirectional precoding so that the SCI can be received in by all UEs, while the PSSCH sidelink data is transmitted by using a directional precoding indicated in the associated SCI.

Embodiments regarding UE selection of the direction for transmission are discussed below.

In one embodiment, the precoder (or the index to a given pre-coder) to use is associated by network configuration or pre-configuration to a specific area in which the UE may need to transmit. The cell or a certain geographical area may be divided in different zones, and for a zone A for example, a precoder may be associated to each zone in the neighborhood of zone A, so that a UE located in zone A will use a different precoder depending on the neighbor zone(s) in which the SL transmission should be directed. In one configuration, the precoder is configured in such a way that there is a unique one-to-one mapping between a zone and a neighbor zone, so that the receiving UE by decoding the SCI can also derive the zone in which the transmitting UE is located (and vice versa). The transmitting UE selects the precoder on the basis of the area/zone in which the intended receiver is currently located.

In another embodiment, each UE may indicate in some control channel (e.g., SCI, CSI report, etc.) the zone in which the UE is located and/or the zone in which the UE will be located in a certain time (e.g. in the next 100 ms) or for how long (time window) a UE will be located in a certain zone, by estimating its own current position, trajectory, speed etc. Namely the UE derives an equivalent area/zone ID in which the UE is currently located/or will be located and informs the neighboring UEs (e.g. in the SCI) as disclosed in previous embodiments. The transmitting UE receiving such information selects the precoder according to the information received.

Alternatively, each UE may indicate the preferred precoder (or an index to the precoder) to be used in next time window, depending on the zone in which the UE estimates itself to be located. The UE may provide a list of preferred precoders in different time windows. For example, the UE may indicate to use precoder A for transmission in the next time window between 0-100 ms, precoder B for transmission between 100 ms and 500 ms, etc., taking as time reference the point in time in which the estimation is given.

Such information may be transmitted in the SCI itself, or in a MAC CE, or a CSI report, and may be transmitted using an omnidirectional precoder.

The transmitting UE receiving such information selects the precoder according to the information received.

The location of the intended receiver can be derived by the transmitting UE in different ways (i.e. either by reading the control channel information provided by the intended receiver, as disclosed in the previous embodiments, or by relying on the ETSI messages payload/headers decoded by higher layers), for example, from the packet header of ETSI messages, such as CAM/DENM messages which contain geographical information such as vehicle geographical coordinates, vehicle trajectory, vehicle speed, etc. The transmitting UE compares its own geographical location with the geographical information received via CAM/DENM to derive the most appropriate precoder. For example, the transmitter may map the received geographical information into equivalent confined areas or zones and apply the associated precoder to SL transmission on PSSCH intended to the concerned receiver. In one method, the transmitting UE takes into account also the vehicle trajectory and speed of the intended receiving UE. For example, even if the receiving UE is currently located in a certain area (zone), the transmitting UE does not select the precoder intended for that zone. The transmitting UE may predict the zone in which the receiving UE will be located by the time the PSSCH transmission is performed and use the associated precoder.

In another embodiment, the precoder to use can be configured differently for different geographical areas and different V2X services to transmit.

Embodiments using the direction information within a UE's sensing process are discussed below. A UE may jointly consider the direction information and time-frequency resource information during the sensing process and may select a resource accordingly for its own transmission.

In one embodiment, a time-frequency resource may be excluded only if the following two conditions are both satisfied: 1) The resource is indicated or reserved by a decoded SCI; and 2) the UE's intended receiver(s) lies in or the UE's selected transmit beam will cross the target transmission area of the transmitting UE that has reserved the resource. The target transmission area is derived by the position and driving direction of the transmitting UE as well as the direction information indicated in SCI (i.e., described in the embodiments under section 5.1). In this case, it is possible that the associated PSSCH RSRP measurement is below the (pre-) configured threshold. In particular, a UE receiving direction information in the SCI can derive the area (or zone) where the transmitting UE is currently located and the area in which the transmitting UE intends to transmit.

Figure 9:
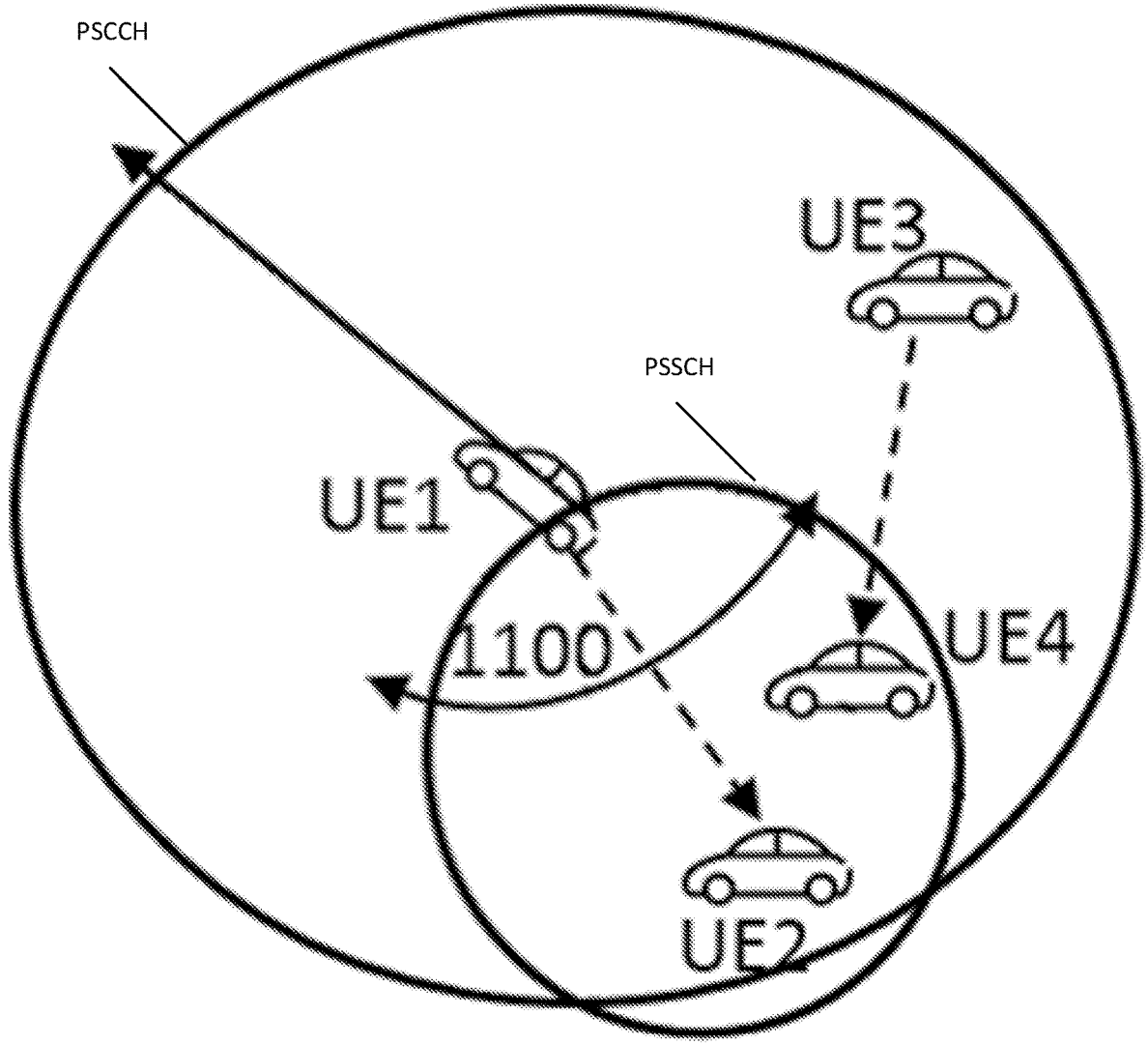
FIGS. 9 and 10 are schematic diagrams illustrating selection of transmission resources based on directional information according to some embodiments of inventive concepts.
Figure 10:
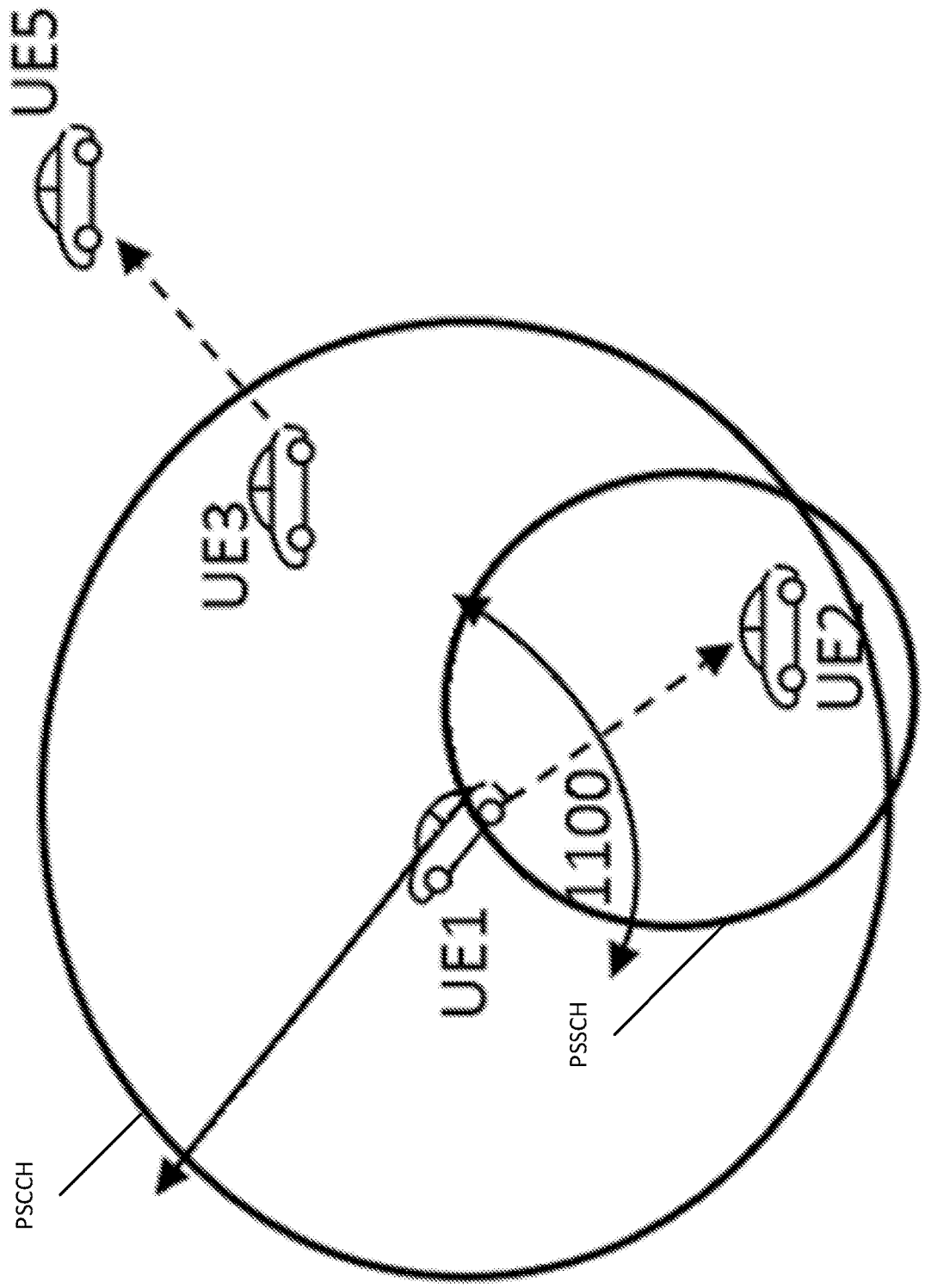

Two examples of such embodiments are illustrated in FIGS. 9 and 10, respectively. In FIG. 9, UE1's intended receiver is UE2 while UE3's intended receiver is UE4. UE1 has reserved time-frequency resource S and direction '1100' for its next transmission and the reservation is indicated in its SCI which is broadcasted. After receiving the SCI, together with UE1's position and driving direction, UE3 knows the target transmission area on resource S by UE1. Then, since UE3 is aware that its intended receiver UE4 falls into the target transmission area, it will exclude resource S within its resource selection process. Another similar example is given in FIG. 10, where UE1's intended receiver is UE2 while UE3's intended receiver is UE5. In this case, since UE5 is out of the target transmission area reserved by UE1, UE3 will keep resource S as its candidate resource.

FIG. 9 illustrates a scenario where UE3 transmits to UE4, and UE4 is within the target transmission area of UE1, while FIG. 10 illustrates a scenario where UE3 transmits to UE5, and UE5 is out of the target transmission area of UE1.

In another embodiment, a resource is excluded within a UE's sensing process without considering the direction information contained in SCI, if the resource is indicated in the decoded SCI and the associated RSRP measurement is above the (pre-)configured threshold. For example, this may be particularly useful when a UE wants to perform broadcast transmissions which coexist with unicast and directional transmissions.

In another embodiment, the UE may select its intended receiver by considering the direction information. In this case, there is no specific a-priori receiver for the UE, which is useful when the UE just wants to select a next hop for multihop communications.

Embodiments on a base station gNB assisted/scheduled resource allocation are discussed below.

The above embodiments are described for scenarios where UEs autonomously select resources (e.g., mode 4 sidelink transmission in LTE). However, some embodiments of inventive concepts can be extended to scenarios where a base station gNB/eNB assists/schedules resource allocation for the UEs (e.g., mode 3 sidelink transmission in LTE).

In one embodiment, the base station gNB assigns time-frequency resources to the UEs by considering their locations and intended transmission directions to increase spatial reuse as well as avoid/reduce co-channel interference. In another embodiment, the base station gNB assigns time-frequency resources and precoders to the UEs by considering their locations and target receivers.

In one embodiment, the base station gNB is aware of the intended transmission direction of a UE by knowing the associated V2X services. For instance, in platooning, the base station gNB is aware that the platoon leader is transmitting messages to its platoon members that are a string of vehicles behind it. In another embodiment, the base station gNB is aware of the transmission direction of a UE by some signalings/reports from the UE to the gNB. For example, the UE can report its intended transmission direction or selected digital precoder to the gNB.

Embodiments using direction information for reception are discussed below.

In an alternative realization of some inventive concepts, a receiver uses a decoded SCI containing direction information to select an antenna configuration for reception. In this way, the receiver UE can improve the performance of reception (e.g., by cancelling out other interference, focusing antennas in a specific direction, etc.). In this case, inventive concepts may include:

1. transmission (by a first UE) of a new field in SCI or any equivalent control channel (such as CSI report, MAC CE, RRC) which includes direction information of future PSSCH transmissions; and/or
2. in response to the reception (by a second UE) of SCI including direction information, using this information to configure the receiver (of the second UE) for reception of the future PSSCH transmission.

According to some embodiments of inventive concepts:
A first UE UE1 transmits SCI indicating the reservation of a time-frequency resource and a direction for a future transmission at time n.
A second UE UE2 decodes the SCI transmitted by UE1.
At time n:
UE1 performs a new transmission according to the reservation.
UE2 configures its receiver taking into account the direction information contained in the decoded SCI.

This approach may be used to enhance the reception of the second transmission by UE1 if UE2 is interested in the transmission. For example, UE2 may select an antenna configuration (e.g., a beam) that is matched to the antenna configuration (e.g., a beam) used by UE1, increasing/maximizing a signal to noise ratio. Alternatively, UE2 may suppress the transmission by UE1 if it is not interested in it (e.g., because it contains messages from a service that are not interesting for UE2, because UE2 considers that UE1 is too far away to be relevant or to expect reception of PSSCH to be decodable, because UE2 is heading on a direction different than UE1, etc.). For example, UE2 may select an antenna configuration (e.g., a beam) that places a null in the direction of UE1.

According to some embodiments of inventive concepts, consider time-frequency resource reservation and direction reservation may be jointly considered for sidelink resource allocation/selection.

Operations of a wireless communication device 1100 will now be discussed with reference to the flow chart of FIG. 13 according to some embodiments of inventive concepts. For example, modules may be stored in memory 1105 of FIG. 11, and these modules may provide instructions so that when the instructions of a module are executed by wireless communication device processor 1103, processor 1103 performs respective operations of the flow chart of FIG. 13. According to some embodiments, operations of FIG. 13 relate to operations of a wireless communication device transmitting a data message, such as wireless communication device UE1 of FIG. 9 or FIG. 10.

Processor 1103 may determine at block 1301 whether/when to transmit a broadcast position message, and processor 1103 may determine at block 1305 whether/when to transmit a data message. Responsive to determining to transmit a broadcast position message at block 1301, processor 1103 may transmit the broadcast position message at block 1303 through transceiver 1101, with the broadcast position message indicating a position of the wireless communication device. The broadcast position message may also indicate a speed of the wireless communication device and/or a direction of movement of the wireless communication device. Moreover, the broadcast position message may be transmitted omnidirectionally as a Co-operative Awareness Message CAM.

Responsive to determining at block 1305 to transmit a data message (e.g., a V2V data message, V2I data message, V2P data message, and/or a V2X data message), processor 1103 may determine at block 1307 whether the data message should be transmitted directionally or omnidirectionally. Responsive to determining at blocks 1305 and 1307 to transmit a data message directionally, processor 1103 may transmit (through transceiver 1101) a resource reservation with associated directional information relating to a direction of transmission of the data message at block 1309. After transmitting the resource reservation, processor 1103 may transmit (through transceiver 1101) the data message at block 1311 in accordance with the directional information relating to the direction of transmission of the data message. Determination of transmission resource(s) for directional transmission is discussed in greater detail below with respect to FIG. 14.

According to some embodiments discussed above with respect to FIG. 6, the directional information may indicate the direction of transmission of the data message relative to a direction of movement of the wireless communication device. According to some other embodiments discussed above with respect to FIG. 7, the directional information may indicate the direction of transmission of the data message relative to an absolute direction (e.g., a compass direction).

According to some embodiments, the resource reservation of block 1309 may be transmitted using a control channel (e.g., PSCCH), and the data message of block 1311 may be transmitted using a shared channel (PSSCH). According to some other embodiments, the resource reservation may be transmitted using a Channel State Information CSI report, a medium access control MAC control element CE, a Radio Resource Control RRC message, and/or Sidelink Control Information SCI.

The directional information of block 1309 may be determined based on a location of an intended receiving device (e.g., wireless communication device UE2 of FIG. 9 or FIG. 10), and the data message may be transmitted to the intended receiving device. For example, the directional information may be determined based on geographical information received from the intended receiving device.

According to some embodiments the directional information of block 1309 may indicate a direction toward which the respective data message is transmitted and/or a nulling transmission direction for the respective data message.

According to some embodiments, the resource reservation of block 1309 may be transmitted using a frequency resource, and the data message may be transmitted at block 1311 using the frequency resource of the resource reservation. The receiving device may thus determine the frequency resource of the data message based on the frequency resource of the resource reservation. According to some embodiments, the data message may be transmitted at block 1311 at a defined time after transmitting the resource reservation at block 1309 so that the receiving device may determine a time resource of the data message based on the time that the resource reservation was transmitted. According to some embodiments, the resource reservation of block 1309 may include an indication of a frequency resource for the data message, and the data message may be transmitted at block 1311 in accordance with the indication of the frequency resource. According to some embodiments, the resource reservation of block 1309 may include an indication of a time resource for the data message, and the data message may be transmitted at block 1311 in accordance with the indication of the time resource.

The data message of block 1311 may be transmitted directionally relative to the resource reservation of block 1309, for example, using an array of antennas to provide beamforming and/or using a directional antenna. Moreover, the data message of block 1311 may be a unicast data message transmitted using an address associated with one other wireless communication device, a groupcast data message transmitted using an address associated with a plurality of other wireless communication devices, and/or a broadcast data message.

Responsive to determining at blocks 1305 and 1307 to transmit a data message omnidirectionally, processor 1103 may transmit (through transceiver 1101) a resource reservation with associated information indicating omnidirectional transmission of a data message at block 1315, and after transmitting such a resource reservation, processor 1103 may transmitting (through transceiver 1101) the respective data message omnidirectionally in accordance with the resource reservation.

Various operations from the flow chart of FIG. 13 may be optional with respect to some embodiments of wireless communication devices and related methods. Regarding methods of example embodiment 1 (set forth below), for example, operations of blocks 1301, 1303, 1305, 1307, 1315, and 1317 of FIG. 13 may be optional.

Operations of a wireless communication device 1100 will now be discussed with reference to the flow chart of FIG. 14 according to some embodiments of inventive concepts. For example, modules may be stored in memory 1105 of FIG. 11, and these modules may provide instructions so that when the instructions of a module are executed by wireless communication device processor 1103, processor 1103 performs respective operations of the flow chart of FIG. 14. According to some embodiments, operations of FIG. 14 relate to operations of a wireless communication device selecting a transmission resource based on a resource reservation received from another wireless communication device, such as wireless communication device UE3 of FIG. 9 or FIG. 10 selecting a transmission resource based on a resource reservation received from wireless communication device UE1.

At block 1401, processor 1103 may receive (through transceiver 1101) a position message from a second wireless communication device UE1 (as shown in FIGS. 9 and 10), with the position message indicating a position of the second wireless communication device UE1 (as shown in FIGS. 9 and 10).

At block 1403, processor 1103 may receive (through transceiver 1101) a first resource reservation from the second wireless communication UE1 (as shown in FIGS. 9 and 10). Moreover, the first resource reservation may be received with associated first directional information relating to a first direction of transmission of a first data message from the second wireless device UE1 (as shown in FIGS. 9 and 10).

At block 1405, processor 1103 may determine a transmission resource for a second data message to be transmitted from the first wireless device UE3 (as shown in FIGS. 9 and 10) based on the first resource reservation and the first directional information relating to the first direction of transmission of the first data message.

For some data messages (e.g., discussed above with respect to FIG. 9), processor 1103 of wireless communication device UE3 (of FIG. 9) may determine the transmission resource for the second data message at block 1405 by determining a first frequency resource of the first data message based on the first resource reservation of block 1403 (from wireless communication device UE1) and by determining a second frequency resource (different than the first frequency resource) for the transmission resource responsive to determining that the first and second data messages are potentially interfering based on the first directional information (of the first reservation resource of block 1403) and the position indicated by the position message (of block 1401). At block 1405, processor 1103 may further determine the transmission resource by determining a second direction of transmission for the second data message. Moreover, processor 1103 may determine that the first and second data messages are potentially interfering based on the first directional information, the position indicated in the position message, and the second direction of transmission for the second data message. At block 1407, processor 1103 may transmit (through transceiver 1101) a second resource reservation with associated second directional information relating to the second direction of transmission for the second data message. At block 1409, processor may transmit the second data message using the second transmission resource determined for the second data message using the second frequency resource in accordance with the second direction of transmission. Processor 1103 of wireless communication device UE3 of FIG. 9 may thus transmit the second resource reservation and the second data message to wireless communication device UE4 of FIG. 9 as discussed above to avoid/reduce interference with respect to the transmission from UE1 to UE2 of FIG. 9.

For some data messages (e.g., discussed above with respect to FIG. 10), processor 1103 of wireless communication device UE3 (of FIG. 10) may determine the transmission resource for the second data message at block 1405 by determining a frequency resource of the first data message based on the first resource reservation of block 1403, and determining the frequency resource for the transmission resource responsive to determining that the first and second data messages are not potentially interfering based on the first directional information and the position indicated by the position message (of block 1401). At block 1405, processor 1103 may further determine the transmission resource for the second data message by determining a second direction of transmission for the second data message, and determining that the first and second data messages are not potentially interfering based on the first directional information for the first data message, the position indicated in the position message, and the second direction of transmission for the second data message. At block 1407, processor 1103 of wireless communication device UE3 of FIG. 10 may transmit (through transceiver 1101) a second resource reservation with associated directional information relating to the second direction of transmission for the second data message. At block 1409, processor 1101 may transmit the second data message using the second transmission resource determined for the second data message using the frequency resource in accordance with the second direction of transmission. Processor 1103 of wireless communication device UE3 of FIG. 10 may thus transmit the second resource reservation and the second data message to wireless communication device UE5 of FIG. 10 as discussed above to reuse the frequency resource used for transmission from UE1 to UE2 of FIG. 10.

The second data message of block 1409 may be transmitted directionally relative to the second resource reservation of block 1407. For example, the second data message of block 1409 may be transmitted directionally using an array of antennas to provide beamforming and/or using a directional antenna.

According to some embodiments, the first resource reservation of block 1403 may be received using a control channel (e.g., PSCCH), the second resource reservation of block 1407 may be transmitted using a control channel (e.g., PSCCH), and the second data message of block 1409 may be transmitted using a shared channel (e.g., PSSCH). According to some embodiments, the first resource reservation of block 1403 may be received using a Channel State Information, CSI, report, a medium access control, MAC, control element, CE, a Radio Resource Control, RRC, message, and/or Sidelink Control Information, SCI. According to some embodiments, the second resource reservation of block 1407 may be transmitted using a Channel State Information, CSI, report, a medium access control, MAC, control element, CE, a Radio Resource Control, RRC, message, and/or Sidelink Control Information, SCI.

Each of the first and second data messages may be at least one of a vehicle-to-vehicle data message, a vehicle-to-infrastructure data message, a vehicle-to-pedestrian data message, and/or a vehicle-to-anything data message. Moreover, the second data message may be a unicast data message transmitted using an address associated with one other wireless communication device, a groupcast data message transmitted using an address associated with a plurality of other wireless communication devices, and/or a broadcast data message.

Various operations from the flow chart of FIG. 14 may be optional with respect to some embodiments of wireless communication devices and related methods. Regarding methods of example embodiment 26 (set forth below), for example, operations of blocks 1401 and 1407 of FIG. 14 may be optional.

Operations of a wireless communication device 1100 will now be discussed with reference to the flow chart of FIG. 15 according to some embodiments of inventive concepts. For example, modules may be stored in memory 1105 of FIG. 11, and these modules may provide instructions so that when the instructions of a module are executed by wireless communication device processor 1103, processor 1103 performs respective operations of the flow chart of FIG. 15. According to some embodiments, operations of FIG. 15 relate to operations of a wireless communication device receiving a resource reservation and a data message from another wireless communication device, such as wireless communication device UE2 of FIG. 9 or FIG. 10 receiving a resource reservation and a data message from wireless communication device UE1.

At block 1501, processor 1103 for a first wireless communication device UE2 (of FIGS. 9 and/or 10) may receive (through transceiver 1101) a position message from a second wireless communication device UE1, with the position message indicating a position of the second wireless communication device. For example, the position message may be a broadcast position message, and the position message may be received as a Co-operative Awareness Message, CAM. In addition, the position message may indicate a direction of movement of the second wireless communication device UE1.

At block 1503, processor 1103 may receive (through transceiver 1101) a resource reservation with associated directional information from the second wireless communication device UE1, with the directional information relating to a direction of transmission of a data message from the second wireless communication device UE1. The directional information may thus indicate a direction toward which the data message will be transmitted. According to some embodiments, the directional information may indicate a direction of transmission of the data message relative to a direction of movement of the second wireless communication device UE1. According to some other embodiments, the directional information may indicate the direction of transmission of the data message relative to an absolute direction.

After receiving the resource reservation, processor 1103 may receive (through transceiver 1101) the data message from the second wireless communication device UE1 at block 1505 in accordance with the resource reservation using the directional information. Moreover, the first wireless communication device UE2 may include an array of antennas, and processor 1103 may receive the data message using a configuration for the array of antennas determined based on the directional information and based on the position of the second wireless communication device.

According to some embodiments, the resource reservation may be received at block 1503 using a control channel (e.g., PSCCH), and the data message may be received at block 1505 using a shared channel (e.g., PSSCH). According to some embodiments, the resource reservation may be received at block 1503 using a Channel State Information CSI report, a medium access control MAC control element CE, a Radio Resource Control RRC message, and/or Sidelink Control Information SCI.

According to some embodiments, the data message at block 1505 may be at least one of a vehicle-to-vehicle data message, a vehicle-to-infrastructure data message, a vehicle-to-pedestrian data message, and/or a vehicle-to-anything data message. Moreover, the data message may be a unicast data message transmitted using an address associated with the first wireless communication device (UE2), a groupcast data message transmitted using an address associated with a plurality of wireless communication devices including the first wireless communication device (UE2), and/or a broadcast data message.

According to some embodiments, the resource reservation may be received at block 1503 using a frequency resource, and the data message may be received at block 1505 using the frequency resource of the resource reservation, so that explicit indication of the frequency resource in the resource reservation is not required. According to some embodiments, the data message may be received at block 1505 a defined time after receiving the resource reservation, so that explicit indication of a time resource is not required in the resource reservation. According to some embodiments, the resource reservation may include an indication of a frequency resource, and the data message may be received in accordance with the indication of the frequency resource. According to some embodiments, the resource reservation may include an indication of a time resource, and the data message may be received in accordance with the indication of the time resource.

Various operations from the flow chart of FIG. 15 may be optional with respect to some embodiments of wireless communication devices and related methods. Regarding methods of example embodiment 40 (set forth below), for example, operations of block 1501 of FIG. 15 may be optional.

Operations of a wireless communication device 1100 will now be discussed with reference to the flow chart of FIG. 16 according to some embodiments of inventive concepts. For example, modules may be stored in memory 1105 of FIG. 11, and these modules may provide instructions so that when the instructions of a module are executed by wireless communication device processor 1103, processor 1103 performs respective operations of the flow chart of FIG. 16. According to some embodiments, operations of FIG. 16 relate to operations of a wireless communication device transmitting a resource reservation and a data message to another wireless communication device using information received from a node (base station) of a radio access network. Corresponding operations of the radio access node are discussed below with respect to FIG. 17.

At block 1601, processor 1103 may determine a direction for transmission of a data message to a second wireless communication device. At block 1603, processor 1103 may transmit (through transceiver 1101) information regarding the data message to a node (e.g., base station) of a radio access network. For example, processor 1103 may transmit an indication of the direction to the node of the radio access network and/or an indication of a service performed by the wireless communication device for the data message.

At block 1605, processor 1103 may receive (through transceiver 1101) an indication of a time and frequency resource to be used for transmission of the data message from a node of a radio access network. At block 1607, processor 1103 may receive (through transceiver 1101) a precoder from the node of the radio access network.

At block 1609, processor 1103 may transmit the data message through transceiver 1101 to the second wireless communication device in accordance with the direction, in accordance with the time and frequency resource, and/or using the precoder. According to some embodiments, the data message of block 1609 may be at least one of a vehicle-to-vehicle data message, a vehicle-to-infrastructure data message, a vehicle-to-pedestrian data message, and/or a vehicle-to-anything data message.

Various operations from the flow chart of FIG. 16 may be optional with respect to some embodiments of wireless communication devices and related methods. Regarding methods of example embodiment 40 (set forth below), for example, operations of blocks 1603 and 1607 of FIG. 16 may be optional.

Operations of a network node (base station) will now be discussed with reference to the flow chart of FIG. 17. For example, modules may be stored in base station memory 1205 of FIG. 12, and these modules may provide instructions so that when the instructions of a module are executed by processor 1203, processor 1203 performs respective operations of the flow chart of FIG. 17. According to some embodiments, operations of FIG. 17 relate to operations of a node (base station) of a radio access network supporting communication between two wireless communication devices. Corresponding operations of a wireless communication device are discussed above with respect to FIG. 16.

At block 1701, processor 1203 may receive (through transceiver 1201) information regarding a data message that is to be transmitted from a first wireless communication device to a second wireless communication device. For example, processor 1203 may receive an indication of the intended direction of the transmission of the data message from the first wireless communication device, and/or an indication of a service performed by the first wireless communication device for the data message.

At block 1703, processor 1203 may determine a time and frequency resource to be used by the first wireless communication device for transmission of the data message, with the time and frequency resource being determined based on an intended direction of transmission of the data message from the wireless communication device. For example, processor 1203 may determine the time and frequency resource based on the indication of the intended direction received from the wireless communication device, and/or based on the indication of the service performed by the wireless communication device for the data message. According to some embodiments, processor 1203 may determine the time and frequency resource based on a location of the first wireless communication device that will transmit the data message and a location of the second wireless communication device that will receive the data message.

At block 1704, processor 1203 may determine a precoder to be used by the first wireless communication device for transmission of the data message, with the precoder being determined based on the intended direction of transmission of the data message from the first wireless communication device. At block 1705, processor 1203 may transmit an indication of the time and frequency resource through transceiver 1201 to the first wireless communication device. At block 1707, processor 1203 may transmit an indication of the precoder to be used through transceiver 1201 to the first wireless communication device.

According to some embodiments, the data message may be at least one of a vehicle-to-vehicle data message, a vehicle-to-infrastructure data message, a vehicle-to-pedestrian data message, and/or a vehicle-to-anything data message. For example, the data message may be a vehicle-to-anything data message, and the time and frequency resource may be determined based on a service performed by the first wireless communication device for the vehicle-to-anything data message.

Various operations from the flow chart of FIG. 17 may be optional with respect to some embodiments of base stations and related methods. Regarding methods of example embodiment 66 (set forth below), for example, operations of blocks 1701, 1704, and 1707 of FIG. 17 may be optional.

Operations of a wireless communication device 1100 will now be discussed with reference to the flow chart of FIG. 18 according to some embodiments of inventive concepts. For example, modules may be stored in memory 1105 of FIG. 11, and these modules may provide instructions so that when the instructions of a module are executed by wireless communication device processor 1103, processor 1103 performs respective operations of the flow chart of FIG. 18. According to some embodiments, operations of FIG. 18 relate to operations of a wireless communication device transmitting a data message, such as wireless communication device UE1 of FIG. 9 or FIG. 10.

At block 1801, processor 1103 may receive (through transceiver 1101) a Co-operative Awareness Message CAM from another wireless communication device intended for reception of a sidelink data message (referred to herein as a receiving wireless communication device), with the CAM message indicating a location/position of the receiving wireless communication device.

At block 1803, processor 1103 may determine directional information for the sidelink data message based on the location/position of the receiving wireless communication device intended for reception of the sidelink data message. The directional information, for example, may indicate a direction of transmission of the sidelink data message relative to a reference direction.

At block 1807, processor 1103 may transmit (through transceiver 1101) a transmission resource reservation with the directional information relating to a direction of transmission of the sidelink data message. The transmission resource reservation may be transmitted using a Channel State Information CSI report, a medium access control MAC control element CE, a Radio Resource Control RRC message, and/or Sidelink Control Information SCI message. Moreover, the transmission resource reservation may be transmitted omnidirectionally.

At block 1809, processor 1103 may transmit (through transceiver 1101) the sidelink data message to the receiving wireless communication device in accordance with the directional information after transmitting the transmission resource reservation.

Various operations from the flow chart of FIG. 14 may be optional with respect to some embodiments of wireless communication devices and related methods. Regarding methods of example embodiment 1 (set forth below), for example, operations of blocks 1801 and 1803 of FIG. 18 may be optional.

Example embodiments of inventive concepts are set forth below.

1. A method of operating a wireless communication device (UE1), the method comprising: transmitting (1309, 1807) a resource reservation with associated directional information relating to a direction of transmission of a data message; and after transmitting the resource reservation, transmitting (1311, 1809) the data message in accordance with the directional information relating to the direction of transmission of the data message.

2. The method of Embodiment 1, wherein transmitting the resource reservation comprises transmitting the resource reservation using a control channel, and wherein transmitting the data message comprises transmitting the data message using a shared channel.

3. The method of Embodiment 2, wherein the control channel comprises a Physical Sidelink Control Channel, PSCCH, and wherein the shared channel comprises a Physical Sidelink Shared Channel, PSSCH.

4. The method of any of Embodiments 1-2, wherein transmitting the resource reservation comprises transmitting the resource reservation using a Channel State Information, CSI, report, a medium access control, MAC, control element, CE, a Radio Resource Control, RRC, message, and/or Sidelink Control Information, SCI.

5. The method of any of Embodiments 1-4, wherein the directional information is determined based on a location of an intended receiving device, wherein transmitting comprises transmitting the data message to the intended receiving device.

6. The method of Embodiment 5, wherein the directional information is determined based on geographical information received from the intended receiving device.

7. The method of any of Embodiments 1-6, wherein the data message comprises at least one of a vehicle-to-vehicle data message, a vehicle-to-infrastructure data message, a vehicle-to-pedestrian data message, and/or a vehicle-to-anything data message.

8. The method of any of Embodiments 1-7, further comprising: transmitting (1303) a broadcast position message, wherein the broadcast position message indicates a position of the wireless communication device.

9. The method of Embodiment 8, wherein the broadcast position message further indicates a speed of the wireless communication device and/or a direction of movement of the wireless communication device.

10. The method of Embodiment 8-9, where the broadcast position message is transmitted as a Co-operative Awareness Message, CAM.

11. The method of any of Embodiments 8-10, wherein the broadcast position message is transmitted omnidirectionally relative to the data message.

12. The method of any of Embodiments 1-11, wherein the resource reservation is transmitted omnidirectionally relative to the data message.

13. The method of any of Embodiments 1-12, wherein the data message is transmitted directionally relative to the resource reservation.

14. The method of any of Embodiments 1-13, wherein the data message is transmitted directionally using an array of antennas to provide beamforming and/or using a directional antenna.

15. The method of any of Embodiments 1-14, wherein the data message is a unicast data message transmitted using an address associated with one other wireless communication device.

16. The method of any of Embodiments 1-14, wherein the data message is a groupcast data message transmitted using an address associated with a plurality of other wireless communication devices.

17. The method of any of Embodiments 1-14, wherein the data message is a broadcast data message.

18. The method of any of Embodiments 1-17, wherein the directional information indicates the direction of transmission of the data message relative to an absolute direction.

19. The method of any of Embodiments 1-7 and 10-17, further comprising: transmitting (1303) a broadcast position message, wherein the broadcast position message indicates a position of the wireless communication device and a direction of movement of the wireless communication device; wherein the directional information indicates the direction of transmission of the data message relative to the direction of movement of the wireless communication device.

20. The method of any of Embodiments 1-19, wherein the resource reservation is a first resource reservation, wherein the data message is a first data message, and wherein the first data message is transmitted directionally in accordance with the directional information, the method further comprising: transmitting (1315) a second resource reservation with associated information indicating omnidirectional transmission of a second data message; and after transmitting the second resource reservation, transmitting (1317) the second data message omnidirectionally in accordance with the second resource reservation.

21. The method of any of Embodiments 1-20, wherein the directional information indicates a direction toward which the data message is transmitted, and/or wherein the directional information indicates a nulling transmission direction for the data message.

22. The method of any of Embodiments 1-21, where transmitting the resource reservation comprises transmitting the resource reservation using a frequency resource, and wherein transmitting the data message comprises transmitting the data message using the frequency resource of the resource reservation.

23. The method of any of Embodiments 1-22, wherein transmitting the data message comprises transmitting the data message a defined time after transmitting the resource reservation.

24. The method of any of Embodiments 1-23, where the resource reservation includes an indication of a frequency resource, and wherein transmitting the data message comprises transmitting the data message in accordance with the indication of the frequency resource.

25. The method of any of Embodiments 1-24, wherein the resource reservation includes an indication of a time resource, and wherein transmitting the data message comprises transmitting the data message in accordance with the indication of the time resource.

26. A method of operating a first wireless communication device (UE3), the method comprising: receiving (1403) a resource reservation from a second wireless communication device (UE1), wherein the resource reservation is received with associated directional information relating to a direction of transmission of a first data message from the second wireless device; determining (1405) a transmission resource for a second data message to be transmitted from the first wireless device based on the first resource reservation and the directional information relating to the direction of transmission of the first data message; and transmitting (1409) the second data message using the transmission resource determined for the second data message.

27. The method of Embodiment 26 further comprising: receiving (1401) a position message from the second wireless communication device (UE1), wherein the position message indicates a position of the second wireless communication device; wherein determining the transmission resource comprises determining a first frequency resource of the first data message based on the resource reservation, and determining a second frequency resource for the transmission resource responsive to determining that the first and second data messages are potentially interfering based on the directional information and the position indicated by the position message, with the first and second frequency resources being different; and wherein transmitting the second data message comprises transmitting the second data message using the second frequency resource.

28. The method of Embodiment 27, wherein the resource reservation is a first resource reservation, wherein the direction of transmission of the first data message is a first direction of transmission, wherein determining the transmission resource comprises determining a second direction of transmission for the second data message, and wherein determining that the first and second data messages are potentially interfering is based on the directional information, the position indicated in the position message, and the second direction of transmission for the second data message, the method further comprising: transmitting (1407) a second resource reservation with associated directional information relating to the second direction of transmission for the second data message; and wherein transmitting the second data message comprises transmitting the second data message in accordance with the second direction of transmission.

29. The method of Embodiment 26 further comprising: receiving (1401) a position message from the second wireless communication device, wherein the position message indicates a position of the second wireless communication device; wherein determining the transmission resource comprises determining a frequency resource of the first data message based on the resource reservation, and determining the frequency resource for the transmission resource responsive to determining that the first and second data messages are not potentially interfering based on the directional information and the position indicated by the position message; and wherein transmitting the second data message comprises transmitting the second data message using the frequency resource.

30. The method of Embodiment 29, wherein the resource reservation is a first resource reservation, wherein the direction of transmission of the first data message is a first direction of transmission, wherein determining the transmission resource comprises determining a second direction of transmission for the second data message, and wherein determining that the first and second data messages are not potentially interfering is based on the directional information, the position indicated in the position message, and the second direction of transmission for the second data message, the method further comprising: transmitting (1407) a second resource reservation with associated directional information relating to the second direction of transmission for the second data message; and wherein transmitting the second data message comprises transmitting the second data message in accordance with the second direction of transmission.

31. The method of any of Embodiments 29 and 30, wherein the second data message is transmitted directionally relative to the second resource reservation.

32. The method of any of Embodiments 26-31, wherein the data message is transmitted directionally using an array of antennas to provide beamforming and/or using a directional antenna.

33. The method of any of Embodiment 26-32, wherein receiving the resource reservation comprises receiving the resource reservation using a control channel, and wherein transmitting the second data message comprises transmitting the second data message using a shared channel.

34. The method of Embodiment 33, wherein the control channel comprises a Physical Sidelink Control Channel, PSCCH, and wherein the shared channel comprises a Physical Sidelink Shared Channel, PSSCH.

35. The method of any of Embodiments 26-33, wherein receiving the resource reservation comprises receiving the resource reservation using a Channel State Information, CSI, report, a medium access control, MAC, control element, CE, a Radio Resource Control, RRC, message, and/or Sidelink Control Information, SCI.

36. The method of any of Embodiments 26-35, wherein each of the first and second data messages comprises at least one of a vehicle-to-vehicle data message, a vehicle-to-infrastructure data message, a vehicle-to-pedestrian data message, and/or a vehicle-to-anything data message.

37. The method of any of Embodiments 26-36, wherein the second data message is a unicast data message transmitted using an address associated with one other wireless communication device.

38. The method of any of Embodiments 26-37, wherein the second data message is a groupcast data message transmitted using an address associated with a plurality of other wireless communication devices.

39. The method of any of Embodiments 26-38, wherein the second data message is a broadcast data message.

40. A method of operating a first wireless communication device (UE2), the method comprising: receiving (1503) a resource reservation with associated directional information from a second wireless communication device (UE1), wherein the directional information relates to a direction of transmission of a data message from the second wireless communication device (UE1); and after receiving the resource reservation, receiving (1505) the data message from the second wireless communication device (UE1) in accordance with the resource reservation.

41. The method of Embodiment 40, wherein receiving the data message comprises receiving the data message using the directional information.

42. The method of any of Embodiments 40-41, wherein the first wireless communication device comprises an array of antennas, and wherein receiving the data message comprises receiving the data message using a configuration for the array of antennas determined based on the directional information.

43. The method of any of Embodiments 40-41, wherein the first wireless communication device comprises an array of antennas, the method further comprising: receiving (1501) a position message from the second wireless communication device, wherein the position message indicates a position of the second wireless communication device; wherein receiving the data message comprises receiving the data message using a configuration for the array of antennas determined based on the directional information and based on the position of the second wireless communication device.

44. The method of Embodiment 43, where the position message is received as a Co-operative Awareness Message, CAM.

45. The method of Embodiment 40-44, wherein receiving the resource reservation comprises receiving the resource reservation using a control channel, and wherein receiving the data message comprises receiving the data message using a shared channel.

46. The method of Embodiment 45, wherein the control channel comprises a Physical Sidelink Control Channel, PSCCH, and wherein the shared channel comprises a Physical Sidelink Shared Channel, PSSCH.

47. The method of any of Embodiments 43-45, wherein receiving the resource reservation comprises receiving the resource reservation using a Channel State Information, CSI, report, a medium access control, MAC, control element, CE, a Radio Resource Control, RRC, message, and/or Sidelink Control Information, SCI.

48. The method of any of Embodiments 40-47, wherein the data message comprises at least one of a vehicle-to-vehicle data message, a vehicle-to-infrastructure data message, a vehicle-to-pedestrian data message, and/or a vehicle-to-anything data message.

49. The method of any of Embodiments 40-48, wherein the data message is a unicast data message transmitted using an address associated with the first wireless communication device (UE2).

50. The method of any of Embodiments 40-48, wherein the data message is a groupcast data message transmitted using an address associated with a plurality of wireless communication devices including the first wireless communication device (UE2).

51. The method of any of Embodiments 40-48, wherein the data message is a broadcast data message.

52. The method of any of Embodiments 40-51, wherein the directional information indicates the direction of transmission of the data message relative to an absolute direction.

53. The method of any of Embodiments 40-42 and 44-52, further comprising: receiving (1501) a broadcast position message from the second wireless communication device (UE1), wherein the broadcast position message indicates a position of the second wireless communication device and a direction of movement of the second wireless communication device; wherein the directional information indicates the direction of transmission of the data message relative to the direction of movement of the second wireless communication device.

54. The method of any of Embodiments 40-53, wherein the directional information indicates a direction toward which the data message is transmitted.

55. The method of any of Embodiments 40-54, where receiving the resource reservation comprises receiving the resource reservation using a frequency resource, and wherein receiving the data message comprises receiving the data message using the frequency resource of the resource reservation.

56. The method of any of Embodiments 40-55, wherein receiving the data message comprises receiving the data message a defined time after receiving the resource reservation.

57. The method of any of Embodiments 40-56, where the resource reservation includes an indication of a frequency resource, and wherein receiving the data message comprises receiving the data message in accordance with the indication of the frequency resource.

58. The method of any of Embodiments 40-57, wherein the resource reservation includes an indication of a time resource, and wherein receiving the data message comprises receiving the data message in accordance with the indication of the time resource.

59. A method of operating a first wireless communication device, the method comprising: determining (1601) a direction for transmission of a data message to a second wireless communication device; receiving (1605) an indication of a time and frequency resource to be used for transmission of the data message from a node of a radio access network; and transmitting (1609) the data message to the second wireless communication device in accordance with the direction and in accordance with the time and frequency resource.

60. The method of Embodiment 59 further comprising: transmitting (1603) an indication of the direction to the node of the radio access network.

61. The method of any of Embodiments 59-60 further comprising: transmitting (1603) an indication of a service performed by the wireless communication device for the data message.

62. The method of any of Embodiments 59-61 further comprising: receiving (1607) a precoder from the node of the radio access network; wherein transmitting the data message comprises transmitting the data message using the precoder.

63. The method of any of Embodiments 59-62, wherein the data message comprises at least one of a vehicle-to-vehicle data message, a vehicle-to-infrastructure data message, a vehicle-to-pedestrian data message, and/or a vehicle-to-anything data message.

64. A first wireless communication device (1100) comprising: a processor (1103); and memory (1105) coupled with the processor, wherein the memory includes instructions that when executed by the processor causes the first wireless communication device to perform operations according to any of Embodiments 1-63.

65. A wireless communication device (1100) wherein the wireless communication device is adapted to perform according to any of Embodiments 1-63.

66. A method of operating a node (1200) of a radio access network, the method comprising: determining (1703) a time and frequency resource to be used by a wireless communication device for transmission of a data message, wherein the time and frequency resource is determined based on an intended direction of transmission of the data message from the wireless communication device; and transmitting (1705) an indication of the time and frequency resource to the wireless communication device.

67. The method of Embodiment 66 further comprising: receiving (1701) an indication of the intended direction of the transmission of the data message from the wireless communication device; wherein determining comprises determining the time and frequency resource based on the indication of the intended direction received from the wireless communication device.

68. The method of any of Embodiments 66-67 further comprising: receiving (1701) an indication of a service performed by the wireless communication device for the data message; wherein determining comprises determining the time and frequency resource based on the indication of the service performed by the wireless communication device for the data message.

69. The method of any of Embodiments 66-68, wherein the wireless communication device is a first wireless communication device, and wherein determining the time and frequency resource comprises determining the time and frequency resource based on a location of the first wireless communication device and a location of a second wireless communication device.

70. The method of any of Embodiments 66-69 further comprising: determining (1704) a precoder to be used by the wireless communication device for transmission of the data message, wherein the precoder is determined based on the intended direction of transmission of the data message from the wireless communication device; and transmitting (1707) an indication of the precoder to be used to the wireless communication device.

71. The method of any of Embodiments 66-70, wherein the data message is a vehicle-to-anything data message, wherein the time and frequency resource is determined based on a service performed by the wireless communication device for the vehicle-to-anything data message.

72. The method of any of Embodiments 66-71, wherein the data message comprises at least one of a vehicle-to-vehicle data message, a vehicle-to-infrastructure data message, a vehicle-to-pedestrian data message, and/or a vehicle-to-anything data message.

73. A node (1200) of a radio access network, the node comprising: a processor (1203); and memory (1205) coupled with the processor, wherein the memory includes instructions that when executed by the processor causes the node to perform operations according to any of Embodiments 66-72.

74. A node (1300) of a radio access network, wherein the node is adapted to perform according to any of Embodiments 66-72.

Explanations for abbreviations from the above disclosure are provided below.

| Abbreviation | Explanation |
| --- | --- |
| D2D | Device to Device |
| LTE | Long-Term Evolution |
| MAC | Medium Access Control |
| MCS | Modulation and Coding Scheme |
| NR | New Radio |
| P-UE | Pedestrian UE |
| PDU | Protocol Data Unit |
| PSCCH | Physical Sidelink Control Channel |
| PSSCH | Physical Sidelink Shared Channel |
| ProSe | Proximity Services |
| QCI | QoS Class Identifier |
| QoS | Quality of Service |
| RB | Resource Block |
| Rel | Release |
| RSRP | Reference Signal Received Power |
| RSSI | Received Signal Strength Indication |
| SA | Scheduling Assignment |
| SCI | Sidelink Control Information |
| SL | Sidelink |
| UE | User Equipment |
| V-UE | Vehicle UE |
| V2I | Vehicle to infrastructure |
| V2N | Vehicle to network |
| V2P | Vehicle to pedestrian |
| V2X | Vehicle to anything |
| CAM | Cooperative Awareness Message |
| DENM | Decentralized Environmental Notification Message |
| RRC | Radio Resource Control |
| CSI | Channel State Information |
| MAC CE | MAC Control Element |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 19:
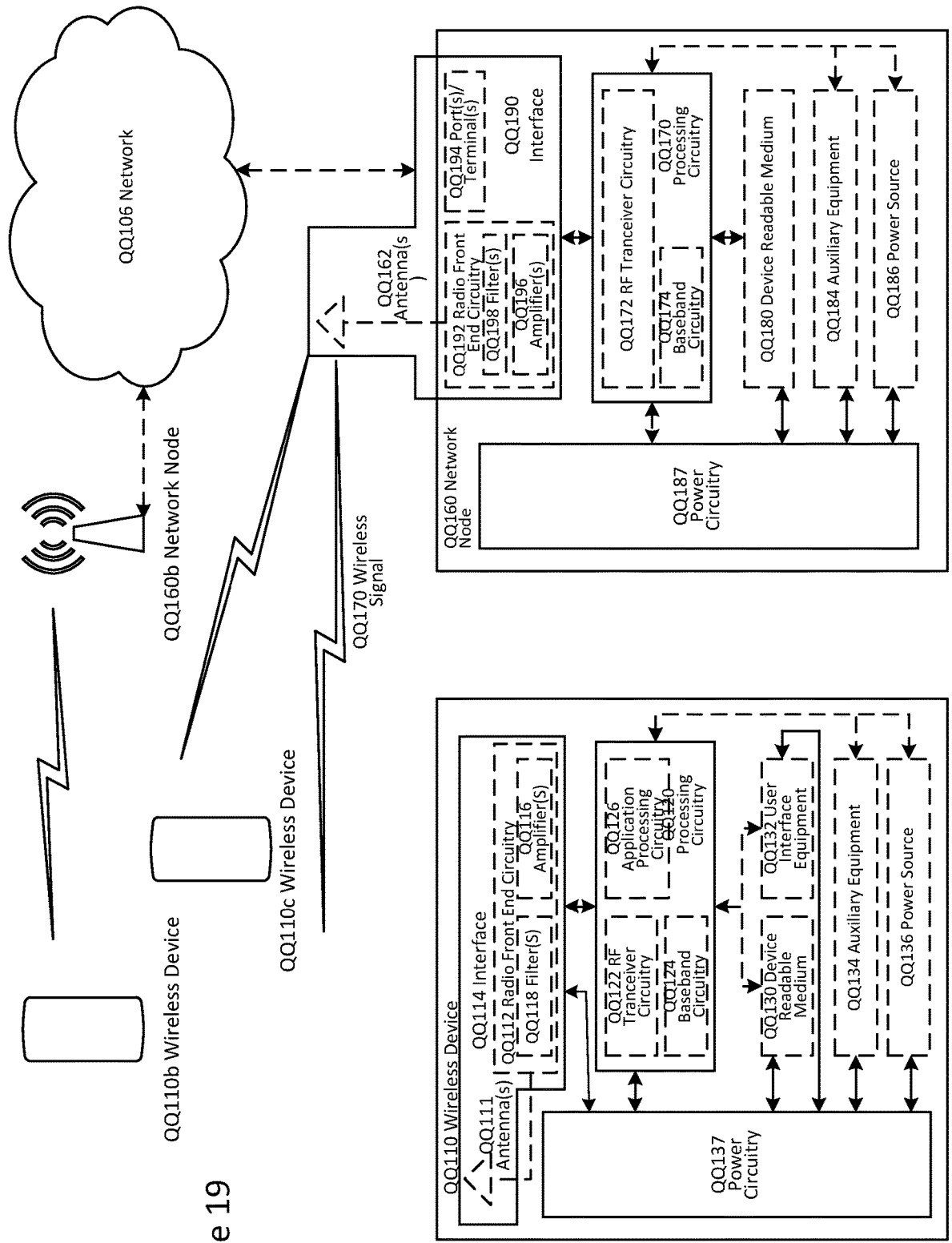
FIG. 19 is a block diagram of a wireless network in accordance with some embodiments.

FIG. 19: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 19 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc.

The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 20:
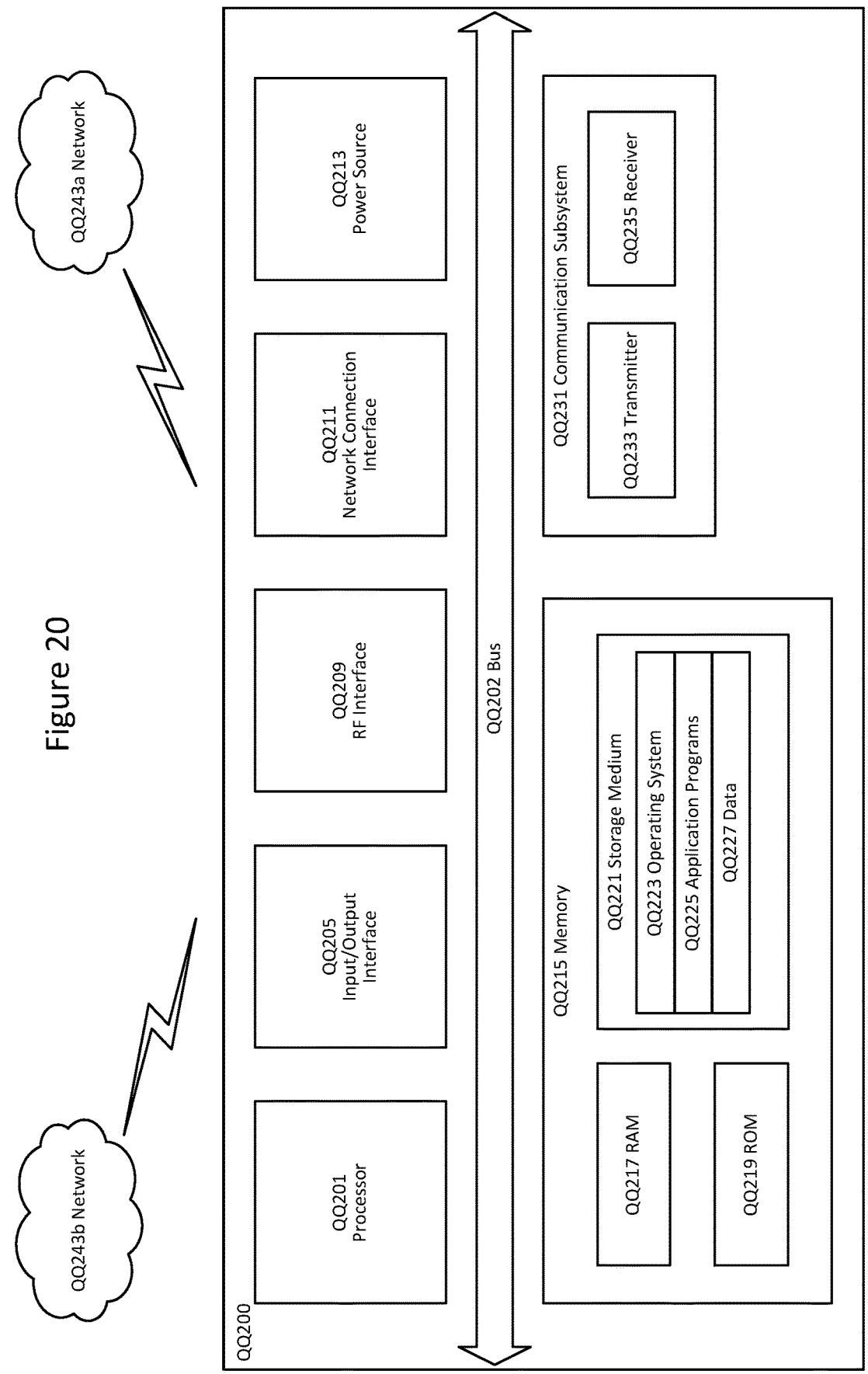
FIG. 20 is a block diagram of a user equipment in accordance with some embodiments

FIG. 20: User Equipment in accordance with some embodiments

FIG. 20 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 20, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 20, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 21:
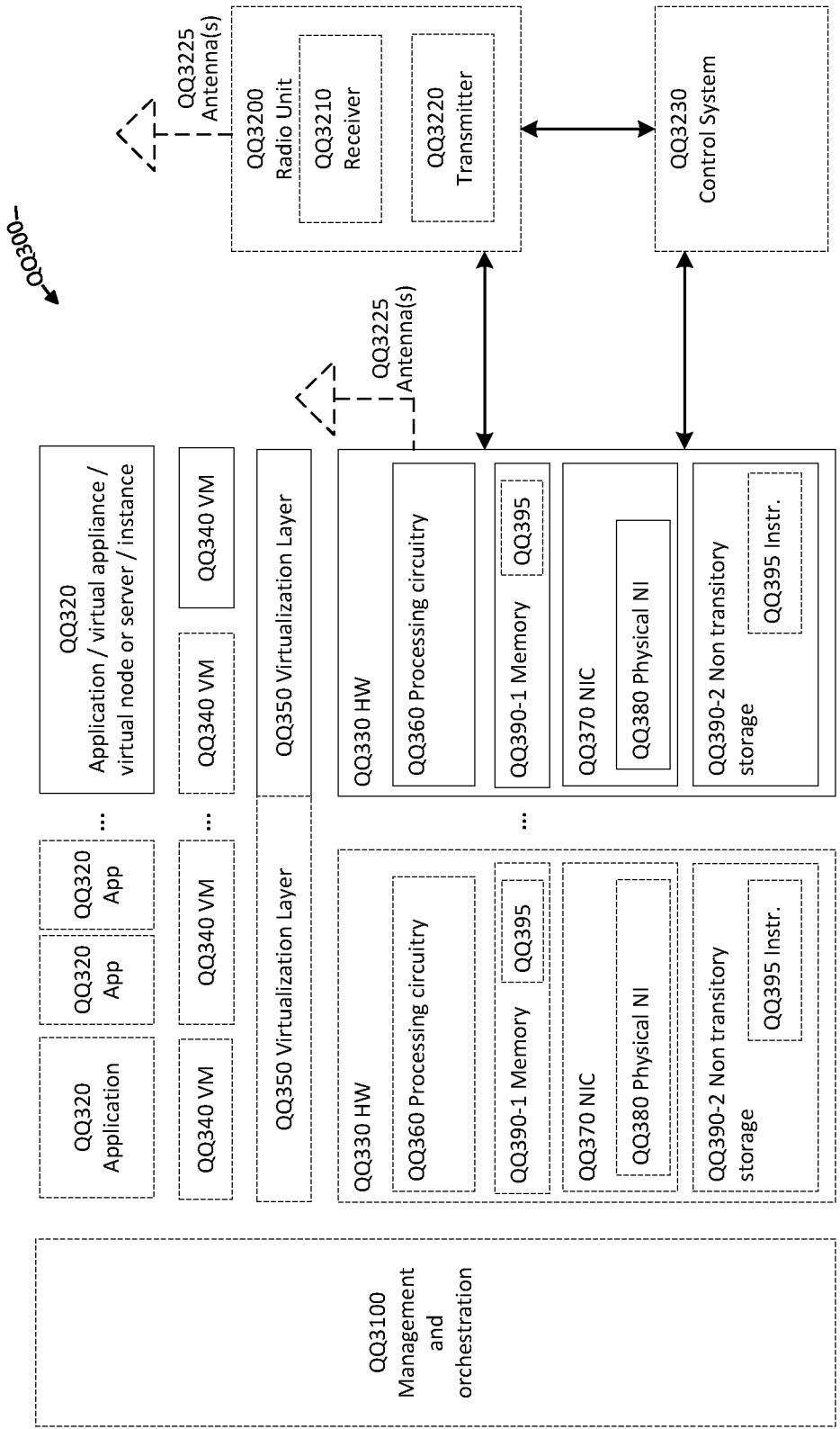
FIG. 21 is a block diagram of a virtualization environment in accordance with some embodiments.

FIG. 21: Virtualization environment in accordance with some embodiments

FIG. 21 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 21, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 21.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 22:
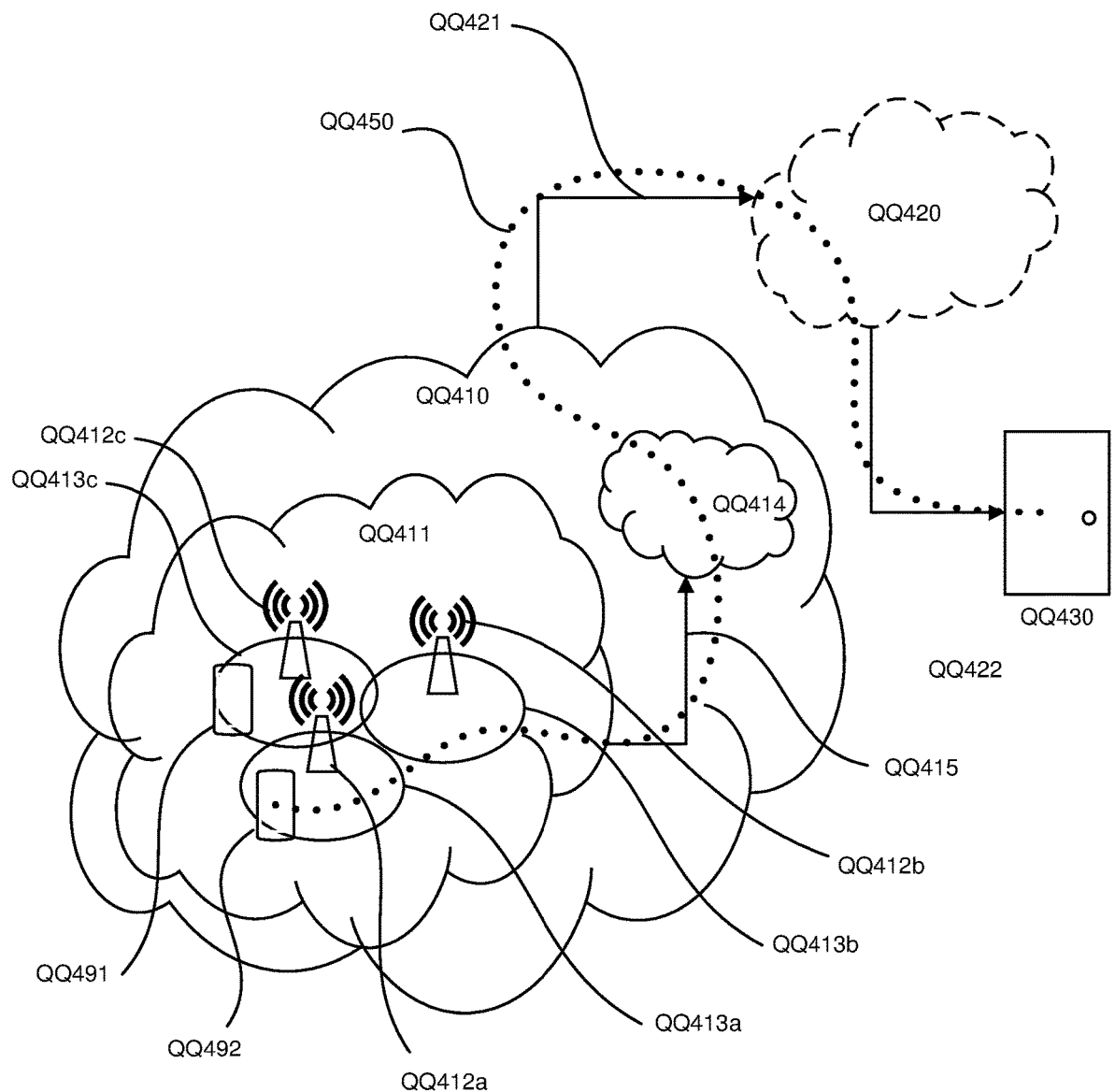
FIG. 22 is a block diagram of a telecommunication network connected via an intermediate network to a host computer in accordance with some embodiments.

FIG. 22: Telecommunication network connected via an intermediate network to a host computer in accordance with some embodiments.

With reference to FIG. 22, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 22 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signalling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 23:
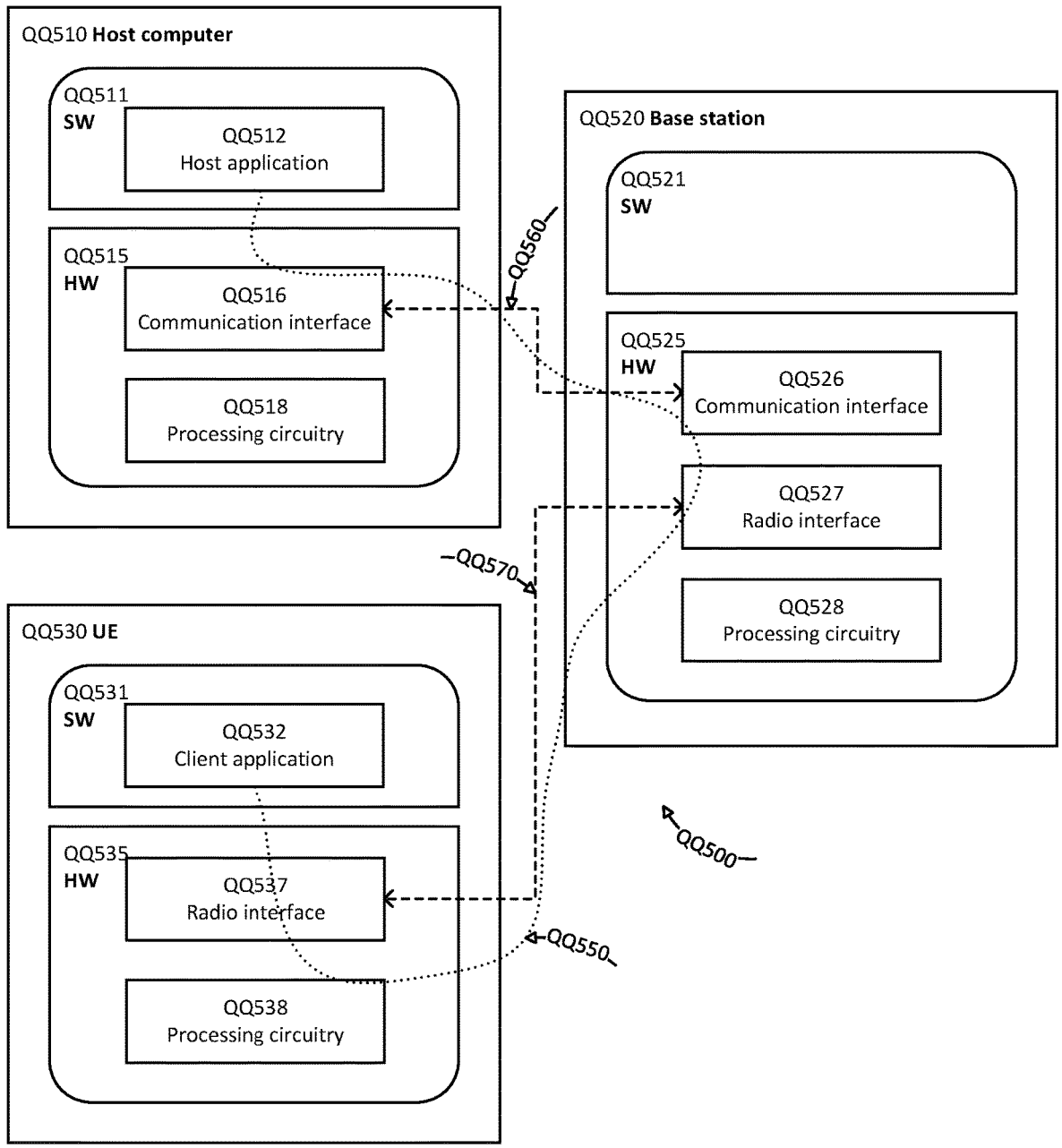
FIG. 23 is a block diagram of a host computer communicating via a base station with a user equipment over a partially wireless connection in accordance with some embodiments.

FIG. 23: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 23. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 23) served by base station QQ520. Communication interface QQ526 may be configured to facilitate connection QQ560 to host computer QQ510. Connection QQ560 may be direct or it may pass through a core network (not shown in FIG. 23) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 23 may be similar or identical to host computer QQ430, one of base stations QQ412a, QQ412b, QQ412c and one of UEs QQ491, QQ492 of FIG. 22, respectively. This is to say, the inner workings of these entities may be as shown in FIG. 23 and independently, the surrounding network topology may be that of FIG. 22.

In FIG. 23, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 24:
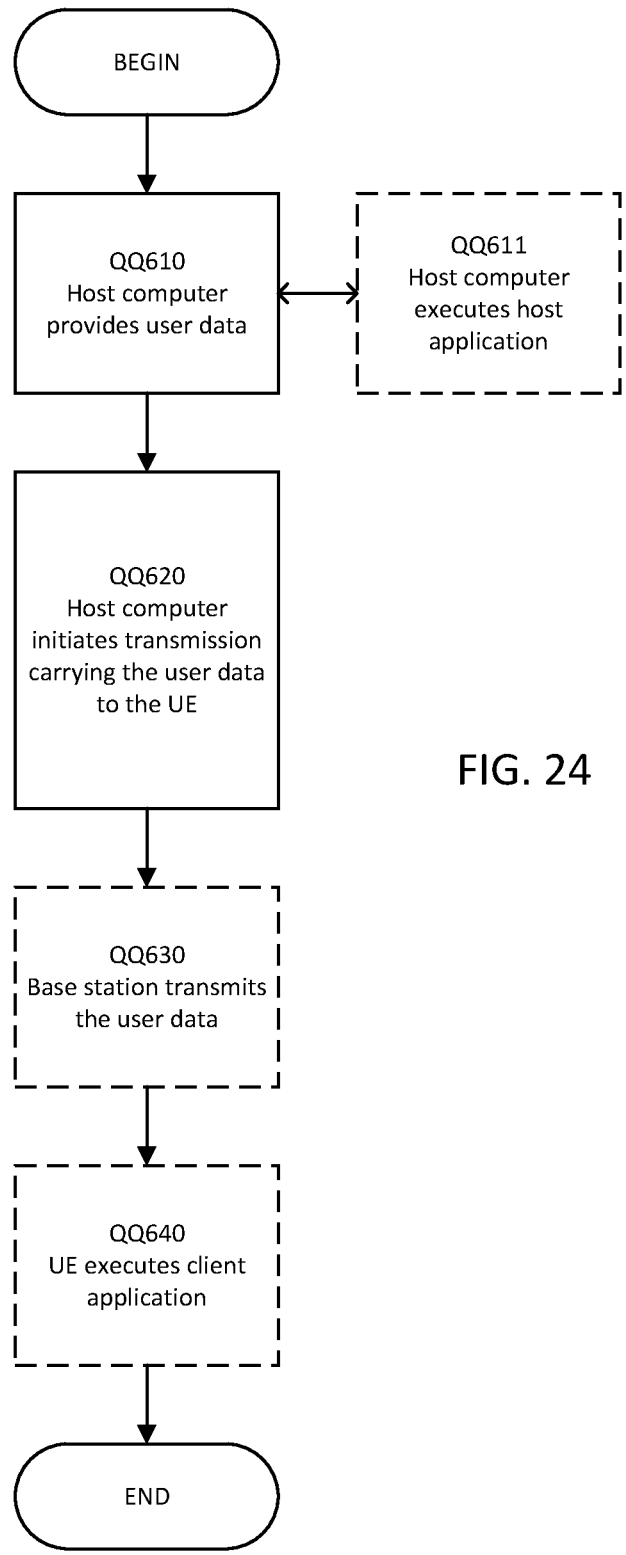
FIG. 24 is a block diagram of methods implemented in a communication system including a host computer, a base station and a user equipment in accordance with some embodiments.

FIG. 24: Methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 25:
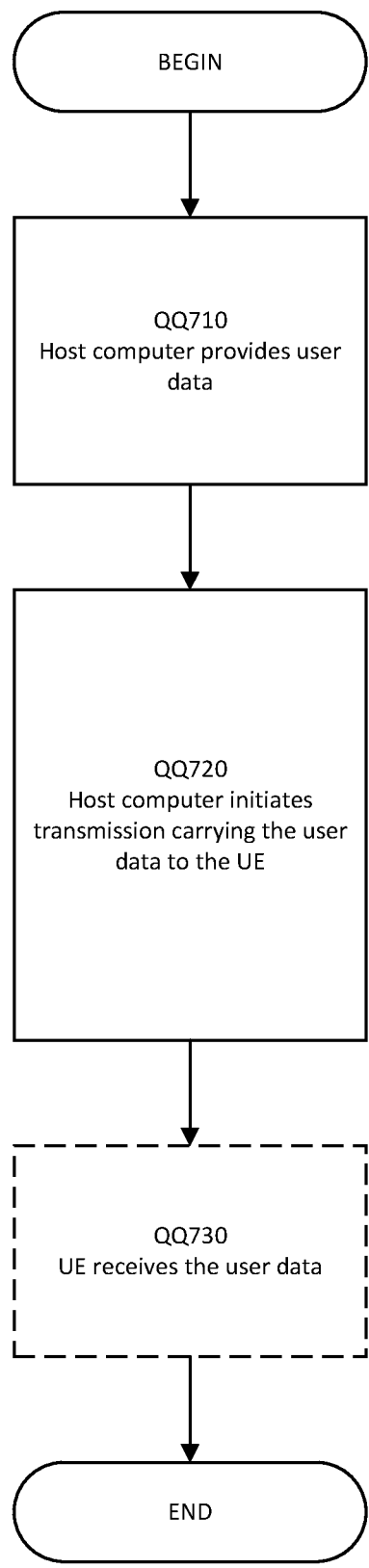
FIG. 25 is a block diagram of methods implemented in a communication system including a host computer, a base station and a user equipment in accordance with some embodiments.

FIG. 25: Methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 26:
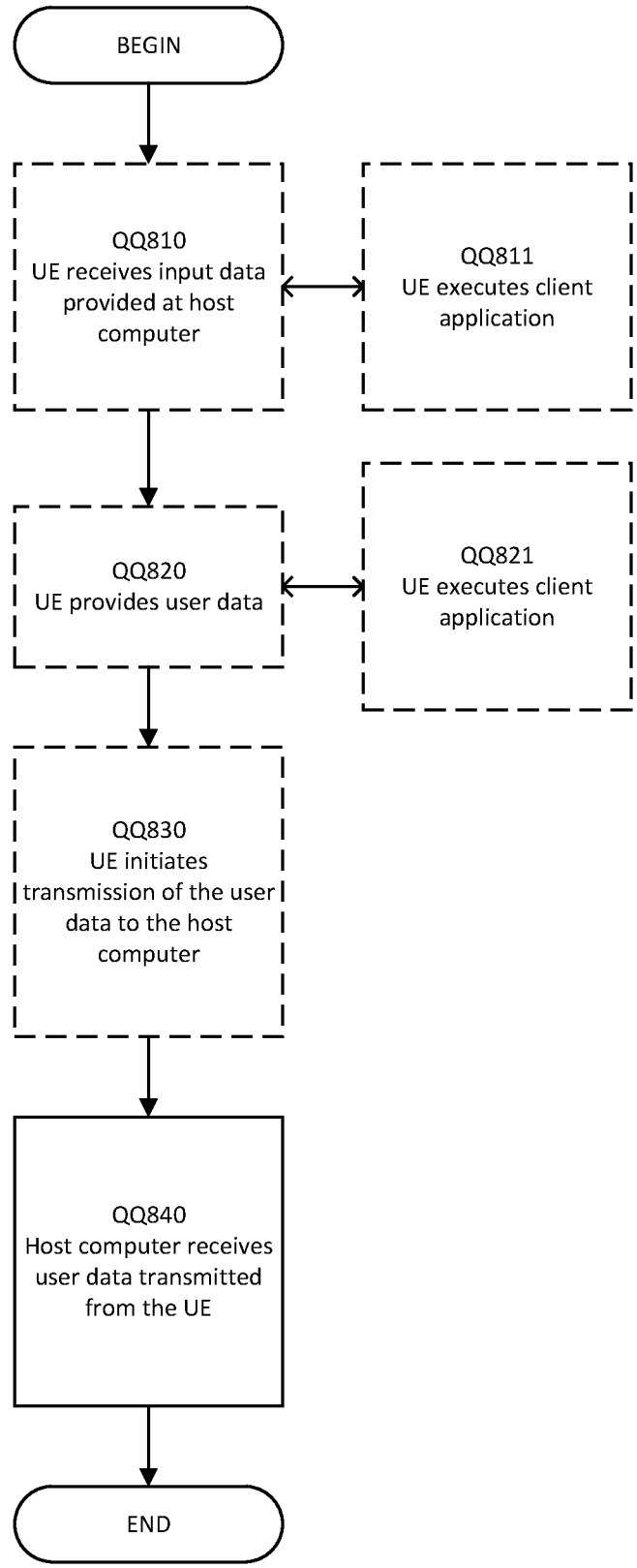
FIG. 26 is a block diagram of methods implemented in a communication system including a host computer, a base station and a user equipment in accordance with some embodiments.

FIG. 26: Methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 27:
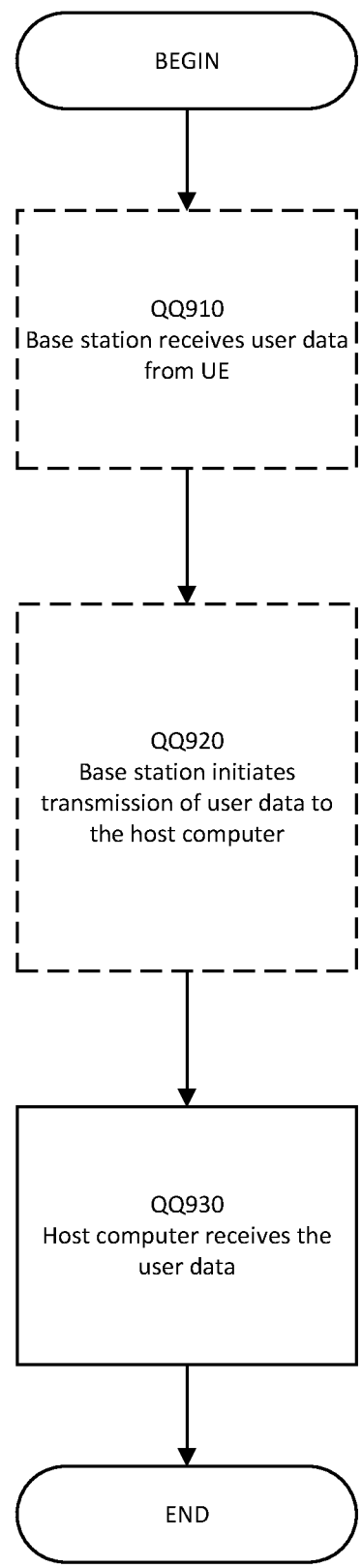
FIG. 27 is a block diagram of methods implemented in a communication system including a host computer, a base station and a user equipment in accordance with some embodiments.

FIG. 27: Methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a wireless communication device, the method comprising:

transmitting a transmission resource reservation with associated directional information relating to a direction of transmission of a sidelink data message, wherein the directional information indicates the direction of transmission of the sidelink data message relative to a direction of movement of the wireless communication device, wherein the directional information indicates: a direction in which the sidelink data message is to be transmitted, and a nulling transmission direction for the sidelink data message, wherein transmitting the transmission resource reservation comprises transmitting resource reservation information using a Sidelink Control Information (SCI) message, and wherein the SCI message is added with a new field that includes the directional information of future transmissions; and after transmitting the transmission resource reservation, transmitting the sidelink data message in accordance with the directional information, wherein the directional information is jointly used with reserved time-frequency resource within a sensing procedure of the wireless communication device.

2. The method of claim 1, wherein transmitting the transmission resource reservation further comprises transmitting resource reservation information using a Channel State Information (CSI) report, a medium access control (MAC) control element (CE), and/or a Radio Resource Control (RRC) message.

3. The method of claim 1, further comprising:

determining the directional information based on a location/position of a receiving wireless communication device intended for reception of the sidelink data message; and wherein the sidelink data message is transmitted to the receiving wireless communication device.

4. The method of claim 3, further comprising:

receiving a Co-operative Awareness Message (CAM) from the receiving wireless communication device indicating the location/position of the receiving wireless communication device.

5. The method of claim 1, wherein the transmission resource reservation is transmitted omnidirectionally.

6. The method of claim 1, wherein the directional information indicates the direction of transmission of the sidelink data message relative to a reference direction.

7. The method of claim 1, further comprising:

transmitting a broadcast Cooperative Awareness Message (CAM) indicating a position of the wireless communication device and the direction of movement of the wireless communication device.

8. The method of claim 1, wherein the transmission resource reservation is a first transmission resource reservation, wherein the sidelink data message is a first sidelink data message, and wherein the first sidelink data message is transmitted directionally in accordance with the directional information associated with the first transmission resource reservation, the method further comprising:

transmitting a second transmission resource reservation with associated information indicating omnidirectional transmission of a second sidelink data message; and after transmitting the second transmission resource reservation, transmitting the second sidelink data message omnidirectionally in accordance with the second transmission resource reservation.

9. The method of claim 1, wherein transmitting the sidelink data message comprises transmitting the sidelink data message a defined time after transmitting the resource reservation.

10. A method of operating a second wireless communication device, the method comprising:

receiving a transmission resource reservation from a first wireless communication device, wherein the transmission resource reservation is received with associated directional information relating to a direction of transmission of a first sidelink data message from the first wireless communication device, wherein the directional information indicates the direction of transmission of the sidelink data message relative to a direction of movement of the first wireless communication device, wherein the directional information indicates: a direction in which the sidelink data message is to be transmitted, and a nulling transmission direction for the sidelink data message, wherein receiving the transmission resource reservation comprises receiving resource reservation information using a Sidelink Control Information (SCI) message, and wherein the SCI message is added with a new field that includes the directional information of future transmissions;

determining a transmission resource for a second sidelink data message to be transmitted from the second wireless communication device based on the transmission resource reservation and the directional information relating to the direction of transmission of the first sidelink data message, wherein the directional information is jointly used with reserved time-frequency resource within a sensing procedure of the wireless communication device; and transmitting the second sidelink data message using the transmission resource determined for the second sidelink data message.

11. The method of claim 10, further comprising:

receiving a position message from the first wireless communication device, wherein the position message indicates a position of the first wireless communication device;

wherein determining the transmission resource for the second sidelink data message comprises determining a first frequency resource of the first sidelink data message based on the transmission resource reservation, and determining a second frequency resource for the second sidelink data message responsive to determining that the first and second sidelink data messages are potentially interfering based on the directional information and based on the position of the first wireless communication device, with the first and second frequency resources being different; and wherein transmitting the second sidelink data message comprises transmitting the second sidelink data message using the second frequency resource.

12. The method of claim 11, wherein the transmission resource reservation is a first transmission resource reservation, wherein the direction of transmission of the first sidelink data message is a first direction of transmission, wherein determining the transmission resource comprises determining a second direction of transmission for the second sidelink data message, and wherein determining that the first and second sidelink data messages are potentially interfering is based on the directional information indicated in the first transmission resource reservation, the position indicated in the position message, and the second direction of transmission for the second sidelink data message, the method further comprising:
  transmitting a second transmission resource reservation with associated directional information relating to the second direction of transmission for the second sidelink data message; and
  wherein transmitting the second sidelink data message comprises transmitting the second sidelink data message in accordance with the second direction of transmission using the second frequency resource.

13. The method of claim 11, wherein the second sidelink data message is transmitted directionally relative to a second transmission resource reservation.

14. The method of claim 10, further comprising:
  receiving a position message from the first wireless communication device, wherein the position message indicates a position of the first wireless communication device;
  wherein determining the transmission resource for the second sidelink data message comprises determining a first frequency resource for the first sidelink data message based on the transmission resource reservation, and determining a second frequency resource for the second sidelink data message responsive to determining that the first and second sidelink data messages are not potentially interfering based on the directional information and the position indicated by the position message, with the first and second frequency resources being the same; and
  wherein transmitting the second sidelink data message comprises transmitting the second sidelink data message using the second frequency resource.

15. The method of claim 14, wherein the transmission resource reservation is a first transmission resource reservation, wherein the direction of transmission of the first sidelink data message is a first direction of transmission, wherein determining the transmission resource comprises determining a second direction of transmission for the second sidelink data message, and wherein determining that the first and second sidelink data messages are not potentially interfering is based on the directional information indicated in the first transmission resource reservation, the position indicated in the position message, and the second direction of transmission for the second sidelink data message, the method further comprising:
  transmitting a second transmission resource reservation with associated directional information relating to the second direction of transmission for the second sidelink data message; and
  wherein transmitting the second sidelink data message comprises transmitting the second sidelink data message in accordance with the second direction of transmission using the second frequency resource.

16. The method of claim 10, wherein receiving the transmission resource reservation further comprises receiving resource reservation information using a Channel State Information (CSI) report, a medium access control (MAC) control element (CE), and/or a Radio Resource Control (RRC) message.

17. A wireless communication device, wherein the wireless communication device comprising circuitry is configured to:
  transmit a transmission resource reservation with associated directional information relating to a direction of transmission of a sidelink data message, wherein the directional information indicates the direction of transmission of the sidelink data message relative to a direction of movement of the wireless communication device, wherein the directional information indicates: a direction in which the sidelink data message is to be transmitted, and a nulling transmission direction for the sidelink data message, wherein transmitting the transmission resource reservation comprises transmitting resource reservation information using a Sidelink Control Information (SCI) message, and wherein the SCI message is added with a new field that includes the directional information of future transmissions; and
  transmit the sidelink data message in accordance with the directional information relating to the direction of transmission of the sidelink data message after transmitting the transmission resource reservation, wherein the directional information is jointly used with reserved time-frequency resource within a sensing procedure of the wireless communication device.

18. A second wireless communication device, wherein the second wireless communication device comprising circuitry is configured to:
  receive a transmission resource reservation from a first wireless communication device, wherein the transmission resource reservation is received with associated directional information relating to a direction of transmission of a first sidelink data message from the first wireless communication device, wherein the directional information indicates the direction of transmission of the sidelink data message relative to a direction of movement of the first wireless communication device, wherein the directional information indicates: a direction in which the sidelink data message is to be transmitted, and a nulling transmission direction for the sidelink data message, wherein receiving the transmission resource reservation comprises receiving resource reservation information using a Sidelink Control Information (SCI) message, and wherein the SCI message is added with a new field that includes the directional information of future transmissions;
  determine a transmission resource for a second sidelink data message to be transmitted from the second wireless communication device based on the first transmission resource reservation and the directional information relating to the direction of transmission of the first sidelink data message, wherein the directional information is jointly used with reserved time-frequency resource within a sensing procedure of the wireless communication device; and
  transmit the second sidelink data message using the transmission resource determined for the second sidelink data message.

* * * * *